United States Patent
Das et al.

(10) Patent No.: US 11,598,962 B1
(45) Date of Patent: Mar. 7, 2023

(54) ESTIMATION OF ACOUSTIC PARAMETERS FOR AUDIO SYSTEM BASED ON STORED INFORMATION ABOUT ACOUSTIC MODEL

(71) Applicant: Meta Platforms Technologies, LLC, Menlo Park, CA (US)

(72) Inventors: Orchisama Das, Stanford, CA (US); Sebastià Vicenç Amengual Garí, Seattle, WA (US); Paul Thomas Calamia, Redmond, WA (US); Philip Robinson, Seattle, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 204 days.

(21) Appl. No.: 17/133,938

(22) Filed: Dec. 24, 2020

(51) Int. Cl.
   *H04R 5/02* (2006.01)
   *G02B 27/01* (2006.01)

(52) U.S. Cl.
   CPC .... *G02B 27/017* (2013.01); *G02B 2027/0178* (2013.01); *H04R 5/02* (2013.01); *H04R 2205/024* (2013.01); *H04S 2420/01* (2013.01)

(58) Field of Classification Search
   CPC ............... H04R 5/02; H04R 2205/024; H04S 2420/01
   USPC ........................................................ 381/310
   See application file for complete search history.

(56) References Cited

U.S. PATENT DOCUMENTS

| | | | |
|---|---|---|---|
| 8,718,301 B1 | 5/2014 | Jouppi et al. | |
| 9,451,210 B1 | 9/2016 | Smus | |
| 9,832,587 B1 | 11/2017 | Park et al. | |
| 10,019,980 B1* | 7/2018 | Abel | G10K 15/12 |
| 10,206,055 B1 | 2/2019 | Mindlin et al. | |
| 10,304,476 B2 | 5/2019 | Glasgow et al. | |
| 10,360,894 B1 | 7/2019 | Rakshit et al. | |
| 10,440,498 B1* | 10/2019 | Amengual Garí | G01H 7/00 |
| 10,555,106 B1 | 2/2020 | Mehra | |
| 10,708,706 B1 | 7/2020 | Brimijoin et al. | |
| 10,735,887 B1* | 8/2020 | McElveen | H04S 7/307 |
| 2008/0167889 A1* | 7/2008 | Kagarlis | G06Q 40/00 705/35 |
| 2012/0093320 A1 | 4/2012 | Flaks et al. | |
| 2019/0087000 A1 | 3/2019 | Ricknäs et al. | |

(Continued)

OTHER PUBLICATIONS

Abel, J. S. et al. "A Modal Architecture for Artificial Reverberation with Application to Room Acoustics Modeling." Audio Engineering Society 137th Convention, Oct. 9-12, 2014, pp. 1-10.

(Continued)

*Primary Examiner* — Katherine A Faley
(74) *Attorney, Agent, or Firm* — Fenwick & West LLP

(57) ABSTRACT

A plurality of modal parameters is estimated for a set of discrete locations within a local area using a set of room impulse responses for the set of discrete locations. The local area includes an audio system. A plurality of acoustic model parameters is generated by fitting the plurality of modal parameters to an acoustic model that accounts for a physical geometry of the local area. The plurality of acoustic model parameters and an indication about the acoustic model are stored for later use by the audio system. The audio system estimates the set of acoustic parameters using the plurality of acoustic model parameters and the indication about the acoustic model, and presents audio content using the set of acoustic parameters.

17 Claims, 11 Drawing Sheets

530

| Physical Space ID 535 | Space Configuration ID 540 | Set of Acoustic Model Parameters 545 | Acoustic Model ID 550 |
|---|---|---|---|
| S1 | S1C1 | {AM_P11} | AM1 |
| | S1C2 | {AM_P12} | |
| | ⋮ | ⋮ | |
| | S1Cp | {AM_P1p} | |
| S2 | S2C1 | {AM_P21} | AM2 |
| | S2C2 | {AM_P22} | |
| | ⋮ | ⋮ | |
| | S2Cq | {AM_P2q} | |
| ⋮ | ⋮ | ⋮ | ⋮ |
| Sn | SnC1 | {AM_Pn1} | AMn |
| | SnC2 | {AM_Pn2} | |
| | ⋮ | ⋮ | |
| | SnCr | {AM_Pnr} | |

(56) References Cited

U.S. PATENT DOCUMENTS

| | | |
|---|---|---|
| 2019/0103849 A1 | 4/2019 | Shaya et al. |
| 2019/0116448 A1 | 4/2019 | Schmidt et al. |
| 2019/0289416 A1 | 9/2019 | York et al. |
| 2021/0097972 A1* | 4/2021 | Herman ................. G10L 25/18 |

OTHER PUBLICATIONS

Brimijoin, WO. et al., "Mic Up! A proposed head-controlled multi-channel wireless system for hearing aids," MRC/CSO Institute of Hearing Research, 1 page.

Furness, D.N., "Abstracts of the Fourth Joint Annual Conference, Experimental and Clinical Short Papers Meetings of the British Society of Audiology," International Journal of Audiology, 2014, vol. 53, No. 9, 57 pages.

Haneda, Y. et al. "Common-Acoustical-Pole and Residue Model and its Application to Spatial Interpolation and Extrapolation of a Room Transfer Function." IEEE Transactions on Speech and Audio Processing, vol. 7, No. 6, Nov. 1999, pp. 709-717.

Hart, J. et al., "The Attentive Hearing Aid: Eye Selection of Auditory Sources for Hearing Impaired Users," International Federation for Information Processing Conference on Human-Computer Interaction, 2009, pp. 19-35.

Kereliuk, C. et al. "Modal Analysis of Room Impulse Responses Using Subband Esprit." Proceedings of the $21^{st}$ International Conference on Digital Audio Effects, Sep. 4-8, 2018, pp. 334-341.

PCT International Search Report and Written Opinion, PCT Application No. PCT/US2020/031406, dated Aug. 11, 2020, 13 pages.

Porschmann, C., "Influences of Bone Conduction and Air Conduction on the Sound of One's Own Voice," Acustica, 2000, vol. 86, pp. 1038-1045.

Robinson, P.W. et al., "Echo thresholds for reflections from acoustically diffusive architectural surfaces," The Journal of the Acoustical Society of America, 2013, vol. 2755, 11 pages.

Whitmer, Wm. et al., "The speech intelligibility benefit of a unilateral wireless system for hearing impaired adults," International Journal of Audiology., Dec. 2011, vol. 50, No. 12, 14 pages.

\* cited by examiner

530

| Physical Space ID 535 | Space Configuration ID 540 | Set of Acoustic Model Parameters 545 | Acoustic Model ID 550 |
|---|---|---|---|
| S1 | S1C1 | {AM_P11} | AM1 |
| | S1C2 | {AM_P12} | |
| | ⋮ | ⋮ | |
| | S1Cp | {AM_P1p} | |
| S2 | S2C1 | {AM_P21} | AM2 |
| | S2C2 | {AM_P22} | |
| | ⋮ | ⋮ | |
| | S2Cq | {AM_P2q} | |
| ⋮ | ⋮ | ⋮ | ⋮ |
| Sn | SnC1 | {AM_Pn1} | AMn |
| | SnC2 | {AM_Pn2} | |
| | ⋮ | ⋮ | |
| | SnCr | {AM_Pnr} | |

Estimate a plurality of modal parameters for a set of discrete locations within a local area using a set of room impulse responses for the set of discrete locations, wherein the local area includes an audio system
605

↓

Generate a plurality of acoustic model parameters by fitting the plurality of modal parameters to an acoustic model that accounts for a physical geometry of the local area
610

↓

Store the plurality of acoustic model parameters and an indication about the acoustic model
615

↓

Provide the plurality of acoustic model parameters and the indication about the acoustic to the audio system for presentation of audio content
620

FIG. 6A

ESTIMATION OF ACOUSTIC PARAMETERS FOR AUDIO SYSTEM BASED ON STORED INFORMATION ABOUT ACOUSTIC MODEL

FIELD OF THE INVENTION

The present disclosure relates generally to presentation of audio at a headset, and specifically relates to estimation of acoustic parameters for an audio system of the headset based on stored information about an acoustic model.

BACKGROUND

A sound perceived at user's ears depends on a direction and a location of a sound source with respect to the user as well as on surroundings of a room in which the sound is perceived. Humans can determine a location of the sound source by comparing the sound perceived at each set of ears. In an artificial reality environment, simulating sound propagation from an object to a listener may use knowledge about acoustic parameters of the room, for example a reverberation time or a direction of incidence of the strongest early reflections. One technique for determining the acoustic parameters of a room includes placing a loudspeaker in a desired source location, playing a controlled test signal, and de-convolving the test signal from what is recorded at a listener location. However, such a technique generally requires a dedicated equipment in-situ.

To seamlessly place a virtual sound source in an environment, sound signals to each ear are determined based on sound propagation paths from the source, through an environment, to a listener (receiver). Various sound propagation paths can be represented based on a set of frequency dependent acoustic parameters used at a headset for presenting audio content to the receiver (user of the headset). A set of frequency dependent acoustic parameters is typically unique for a specific acoustic configuration of a local environment (room) that has a unique acoustic property. However, storing and updating various sets of acoustic parameters for all possible acoustic configurations of the local environment is impractical. Various sound propagation paths within a room between a source and a receiver represent a room impulse response, which depends on specific locations of the source and receiver. It is however memory intensive to store measured or simulated acoustic parameters for a dense network of all possible source and receiver locations in a space, or even a relatively small subset of the most common arrangements. Therefore, determination of acoustic parameters in real-time is computationally intensive as the required accuracy increases.

SUMMARY

Embodiments of the present disclosure support a method, computer readable medium, and apparatus for estimating a set of acoustic parameters for presentation of audio content by an audio system. A plurality of modal parameters is estimated for a set of discrete locations within a local area using a set of room impulse responses for the set of discrete locations, wherein the local area includes the audio system. A plurality of acoustic model parameters is generated by fitting the plurality of modal parameters to an acoustic model that accounts for a physical geometry of the local area. The plurality of acoustic model parameters and an indication (e.g., an identifier) about the acoustic model are stored, e.g., at a non-transitory computer-readable storage medium. The audio system presents audio content using the set of acoustic parameters estimated based on the stored plurality of acoustic model parameters and the indication about the acoustic model.

BRIEF DESCRIPTION OF THE DRAWINGS

FIG. 5B is an example of a virtual model describing physical spaces and acoustic properties of the physical spaces, in accordance with one or more embodiments.

FIG. 6A is a flowchart illustrating a process for generating and storing a plurality of acoustic model parameters and an indication about an acoustic model, in accordance with one or more embodiments.

Figure 1A:
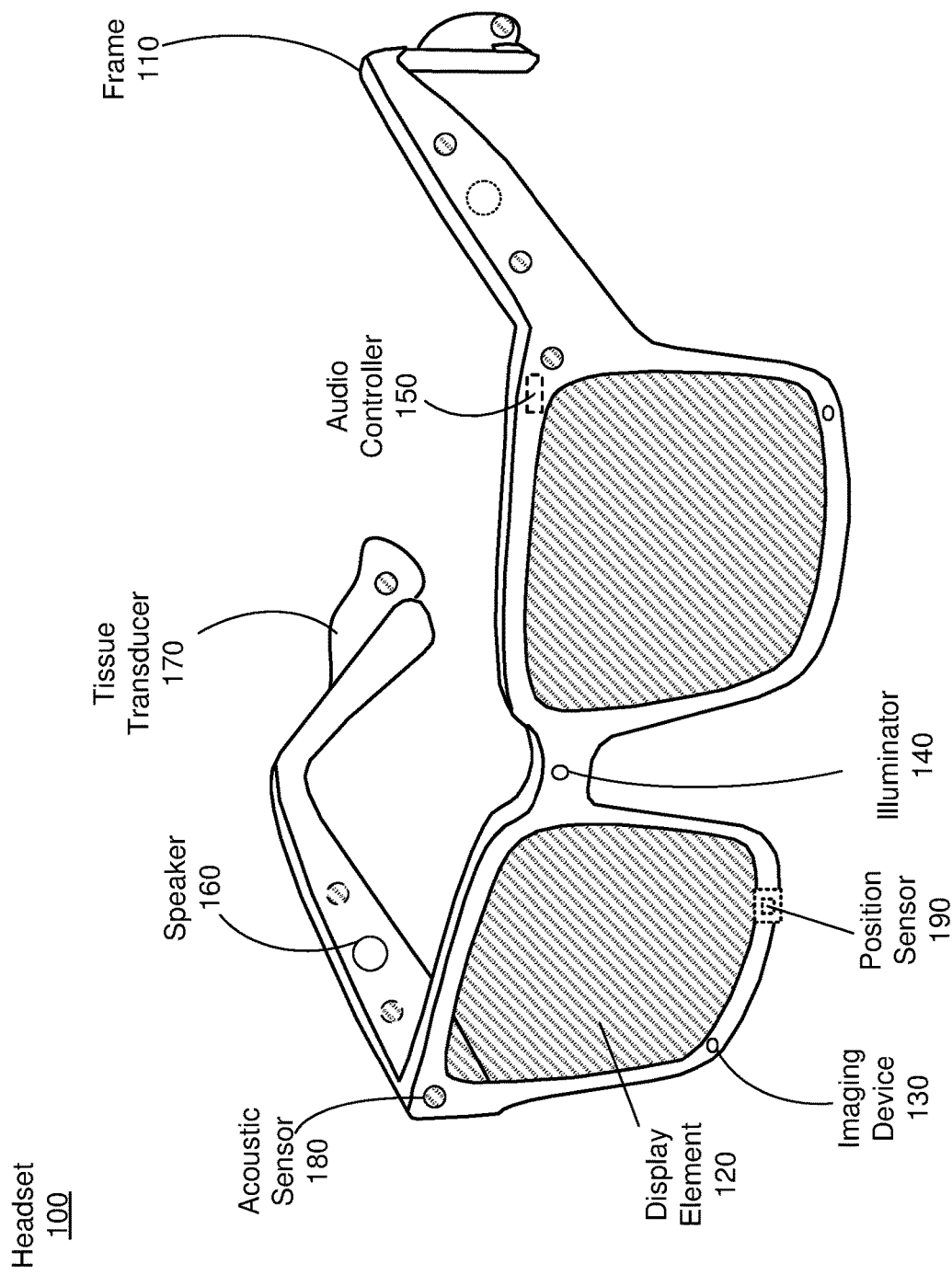
FIG. 1A is a perspective view of a headset implemented as an eyewear device, in accordance with one or more embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Embodiments of the present disclosure relate to estimation of a set of acoustic parameters corresponding to an arbitrary location of an audio system in a local area (e.g., relative to a position of a sound source) for presentation of audio content. An acoustic parameter describes an acoustic property of the local area. An acoustic parameter may be, e.g. a room impulse response, a reverberation time, a reverberation level, some other acoustic property, or some combination thereof. The audio system or a mapping server can first estimate a plurality of modal parameters (e.g., an amplitude, a frequency and a decay factor for at least one specific acoustic mode of the local area) for a set of discrete locations of the local area using a set of available room impulse responses for the set of discrete locations. The set of available room impulse responses may be measured by the audio system or estimated using one or more other audio systems. The plurality of modal parameters may be estimated by applying, e.g., a signal classification based algorithm to the set of room impulse responses. The audio system or the mapping server can then generate a set of acoustic model parameters (e.g., wave numbers in each dimension of the local area and one or more constants) by fitting the plurality of modal parameters to an acoustic model that accounts for a physical geometry (and possibly some additional physical properties) of the local area. The audio system or the mapping server may perform a non-linear optimization algorithm to fit the plurality of modal parameters to the acoustic model to generate the set of acoustic model parameters.

The set of acoustic model parameters and an identifier of the acoustic model are stored at a specific location of a non-transitory computer-readable storage medium of the mapping server or the audio system. The storage medium stores different sets of acoustic model parameters associated with different identifiers of acoustic models for various local areas with different physical properties. The audio system retrieves, from the storage medium, an appropriate set of acoustic model parameters and an identifier of a corresponding acoustic model, using information about physical properties of the local area where the audio system is currently located or will be located within a threshold time period. The audio system estimates a set of acoustic parameters for an arbitrary location in the local area corresponding to a location of the audio system, based on the retrieved acoustic model parameters and the identifier of the corresponding acoustic model. The audio system presents audio content using the set of acoustic parameters estimated for the arbitrary location.

One advantage of the presented method for estimation of acoustic parameters is that a limited amount of acoustic model parameters for only a set of discrete locations should be stored and utilized (along with identifiers of acoustic models), thus providing efficiency in terms of memory storage. Another advantage of the presented method is that acoustic parameters for any arbitrary location of an audio system in a local area can be efficiently and accurately estimated (i.e., interpolated or extrapolated) using the limited amount of stored acoustic model parameters and the identifiers of the acoustic models, thus providing efficiency in terms of computational performance and accuracy.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to create content in an artificial reality and/or are otherwise used in an artificial reality. The artificial reality system that provides the artificial reality content may be implemented on various platforms, including a wearable device (e.g., headset) connected to a host computer system, a standalone wearable device (e.g., headset), a mobile device or computing system, or any other hardware platform capable of providing artificial reality content to one or more viewers.

FIG. 1A is a perspective view of a headset 100 implemented as an eyewear device, in accordance with one or more embodiments. In some embodiments, the eyewear device is a near eye display (NED). In general, the headset 100 may be worn on the face of a user such that content (e.g., media content) is presented using a display assembly and/or an audio system. However, the headset 100 may also be used such that media content is presented to a user in a different manner. Examples of media content presented by the headset 100 include one or more images, video, audio, or some combination thereof. The headset 100 includes a frame, and may include, among other components, a display assembly including one or more display elements 120, a depth camera assembly (DCA), an audio system, and a position sensor 190. While FIG. 1A illustrates the components of the headset 100 in example locations on the headset 100, the components may be located elsewhere on the headset 100, on a peripheral device paired with the headset 100, or some combination thereof. Similarly, there may be more or fewer components on the headset 100 than what is shown in FIG. 1A.

The frame 110 holds the other components of the headset 100. The frame 110 includes a front part that holds the one or more display elements 120 and end pieces (e.g., temples) to attach to a head of the user. The front part of the frame 110 bridges the top of a nose of the user. The length of the end pieces may be adjustable (e.g., adjustable temple length) to fit different users. The end pieces may also include a portion that curls behind the ear of the user (e.g., temple tip, ear piece).

The one or more display elements 120 provide light to a user wearing the headset 100. As illustrated the headset includes a display element 120 for each eye of a user. In some embodiments, a display element 120 generates image light that is provided to an eye-box of the headset 100. The eye-box is a location in space that an eye of user occupies while wearing the headset 100. For example, a display element 120 may be a waveguide display. A waveguide display includes a light source (e.g., a two-dimensional source, one or more line sources, one or more point sources, etc.) and one or more waveguides. Light from the light source is in-coupled into the one or more waveguides which outputs the light in a manner such that there is pupil replication in an eye-box of the headset 100. In-coupling and/or outcoupling of light from the one or more waveguides may be done using one or more diffraction gratings. In some embodiments, the waveguide display includes a scanning element (e.g., waveguide, mirror, etc.) that scans light from the light source as it is in-coupled into the one or more waveguides. Note that in some embodiments, one or both of the display elements 120 are opaque and do not transmit light from a local area around the headset 100. The local area is the area surrounding the headset 100. For example, the local area may be a room that a user wearing the headset 100 is inside, or the user wearing the headset 100 may be outside and the local area is an outside area. In this context, the headset 100 generates VR content. Alternatively, in some embodiments, one or both of the display elements 120 are at least partially transparent, such that light from the local area may be combined with light from the one or more display elements to produce AR and/or MR content.

In some embodiments, a display element 120 does not generate image light, and instead is a lens that transmits light from the local area to the eye-box. For example, one or both of the display elements 120 may be a lens without correction (non-prescription) or a prescription lens (e.g., single vision, bifocal and trifocal, or progressive) to help correct for defects in a user's eyesight. In some embodiments, the display element 120 may be polarized and/or tinted to protect the user's eyes from the sun.

In some embodiments, the display element 120 may include an additional optics block (not shown). The optics block may include one or more optical elements (e.g., lens, Fresnel lens, etc.) that direct light from the display element 120 to the eye-box. The optics block may, e.g., correct for aberrations in some or all of the image content, magnify some or all of the image, or some combination thereof.

The DCA determines depth information for a portion of a local area surrounding the headset 100. The DCA includes one or more imaging devices 130 and a DCA controller (not shown in FIG. 1A), and may also include an illuminator 140. In some embodiments, the illuminator 140 illuminates a portion of the local area with light. The light may be, e.g., structured light (e.g., dot pattern, bars, etc.) in the infrared (IR), IR flash for time-of-flight, etc. In some embodiments, the one or more imaging devices 130 capture images of the portion of the local area that include the light from the illuminator 140. As illustrated, FIG. 1A shows a single illuminator 140 and two imaging devices 130. In alternate embodiments, there is no illuminator 140 and at least two imaging devices 130.

The DCA controller computes depth information for the portion of the local area using the captured images and one or more depth determination techniques. The depth determination technique may be, e.g., direct time-of-flight (ToF) depth sensing, indirect ToF depth sensing, structured light, passive stereo analysis, active stereo analysis (uses texture added to the scene by light from the illuminator 140), some other technique to determine depth of a scene, or some combination thereof.

The DCA may include an eye tracking unit that determines eye tracking information. The eye tracking information may comprise information about a position and an orientation of one or both eyes (within their respective eye-boxes). The eye tracking unit may include one or more cameras. The eye tracking unit estimates an angular orientation of one or both eyes based on images captures of one or both eyes by the one or more cameras. In some embodiments, the eye tracking unit may also include one or more illuminators that illuminate one or both eyes with an illumination pattern (e.g., structured light, glints, etc.). The eye tracking unit may use the illumination pattern in the captured images to determine the eye tracking information. The headset 100 may prompt the user to opt in to allow operation of the eye tracking unit. For example, by opting in the headset 100 may detect, store, images of the user's any or eye tracking information of the user.

The audio system provides audio content. The audio system includes a transducer array, a sensor array, and an audio controller 150. However, in other embodiments, the audio system may include different and/or additional components. Similarly, in some cases, functionality described with reference to the components of the audio system can be distributed among the components in a different manner than is described here. For example, some or all of the functions of the controller may be performed by a remote server.

The transducer array presents sound to user. The transducer array includes a plurality of transducers. A transducer may be a speaker 160 or a tissue transducer 170 (e.g., a bone conduction transducer or a cartilage conduction transducer). Although the speakers 160 are shown exterior to the frame 110, the speakers 160 may be enclosed in the frame 110. In some embodiments, instead of individual speakers for each ear, the headset 100 includes a speaker array comprising multiple speakers integrated into the frame 110 to improve directionality of presented audio content. The tissue transducer 170 couples to the head of the user and directly vibrates tissue (e.g., bone or cartilage) of the user to generate sound. The number and/or locations of transducers may be different from what is shown in FIG. 1A.

The sensor array detects sounds within the local area of the headset 100. The sensor array includes a plurality of acoustic sensors 180. An acoustic sensor 180 captures sounds emitted from one or more sound sources in the local area (e.g., a room). Each acoustic sensor is configured to detect sound and convert the detected sound into an electronic format (analog or digital). The acoustic sensors 180 may be acoustic wave sensors, microphones, sound transducers, or similar sensors that are suitable for detecting sounds.

In some embodiments, one or more acoustic sensors 180 may be placed in an ear canal of each ear (e.g., acting as binaural microphones). In some embodiments, the acoustic sensors 180 may be placed on an exterior surface of the headset 100, placed on an interior surface of the headset 100, separate from the headset 100 (e.g., part of some other device), or some combination thereof. The number and/or locations of acoustic sensors 180 may be different from what is shown in FIG. 1A. For example, the number of acoustic detection locations may be increased to increase the amount of audio information collected and the sensitivity and/or accuracy of the information. The acoustic detection locations may be oriented such that the microphone is able to detect sounds in a wide range of directions surrounding the user wearing the headset 100.

The audio controller 150 processes information from the sensor array that describes sounds detected by the sensor array. The audio controller 150 may comprise a processor and a computer-readable storage medium. The audio controller 150 may be configured to generate direction of arrival (DOA) estimates, generate acoustic transfer functions (e.g., array transfer functions and/or head-related transfer functions), track the location of sound sources, form beams in the direction of sound sources, classify sound sources, generate sound filters for the speakers 160, or some combination thereof.

The audio controller 150 estimates one or more acoustic parameters based in part on a target location in the local area for a virtual sound source, a position of the audio system in the local area, a plurality of acoustic model parameters and an indication (e.g., an identifier) for an acoustic model that accounts for a physical geometry (and possibly one or more additional acoustic properties) of the local area. An indication for an acoustic model is a unique description for the acoustic model. An indication for an acoustic model may be, e.g., an identifier of the acoustic model, an identifier of a mathematical expression representing the acoustic model, a look-up table describing the acoustic model, some other unique description for the acoustic model, or some combination thereof. The audio controller 150 retrieves the plurality of acoustic model parameters and the indication for the acoustic model from, e.g., a non-transitory computer-readable storage medium. The storage medium may be part of the headset 100. In such case, the audio controller 150 may also determine the plurality of acoustic model parameters.

Alternatively, the storage medium may be separate from the headset 100, e.g., part of a mapping server (not shown in FIG. 1A). In such case, the mapping server may determine the plurality of acoustic model parameters and store them in its storage medium. The audio controller 150 may be connected (e.g., via a wired or wireless connection) with the mapping server. Upon receiving a request for a set of acoustic model parameters from the audio controller 150, the mapping server may retrieve and provide the set of acoustic model parameters along with the indication for the acoustic model to the audio controller 150. Additional details regarding operations of the audio system are discussed below in connection with FIG. 4 and FIGS. 6A-6C. Additional details regarding operations of the mapping server are discussed below in connection with FIGS. 5A-5B and FIGS. 6A-6B.

The position sensor 190 generates one or more measurement signals in response to motion of the headset 100. The position sensor 190 may be located on a portion of the frame 110 of the headset 100. The position sensor 190 may include an inertial measurement unit (IMU). Examples of position sensor 190 include: one or more accelerometers, one or more gyroscopes, one or more magnetometers, another suitable type of sensor that detects motion, a type of sensor used for error correction of the IMU, or some combination thereof. The position sensor 190 may be located external to the IMU, internal to the IMU, or some combination thereof.

In some embodiments, the headset 100 may provide for simultaneous localization and mapping (SLAM) for a position of the headset 100 and updating of a model of the local area. For example, the headset 100 may include a passive camera assembly (PCA) that generates color image data. The PCA may include one or more RGB cameras that capture images of some or all of the local area. In some embodiments, some or all of the imaging devices 130 of the DCA may also function as the PCA. The images captured by the PCA and the depth information determined by the DCA may be used to determine parameters of the local area, generate a model of the local area, update a model of the local area, or some combination thereof. Furthermore, the position sensor 190 tracks the position (e.g., location and pose) of the headset 100 within the room. Additional details regarding the components of the headset 100 are discussed below in connection with FIG. 4.

Figure 1B:
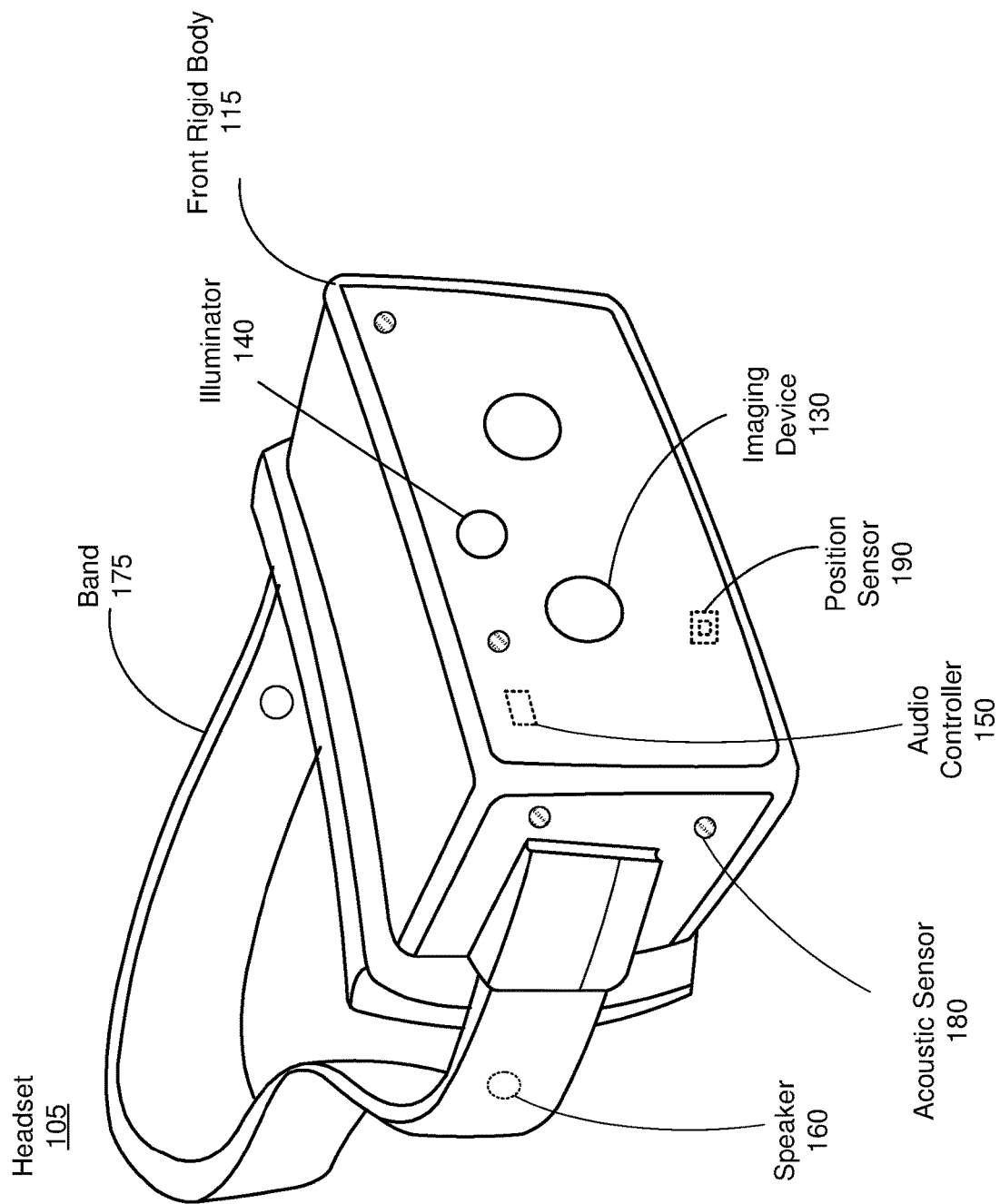
FIG. 1B is a perspective view of a headset implemented as a head-mounted display, in accordance with one or more embodiments.

FIG. 1B is a perspective view of a headset 105 implemented as a HMD, in accordance with one or more embodiments. In embodiments that describe an AR system and/or a MR system, portions of a front side of the HMD are at least partially transparent in the visible band (~380 nm to 750 nm), and portions of the HMD that are between the front side of the HMD and an eye of the user are at least partially transparent (e.g., a partially transparent electronic display). The HMD includes a front rigid body 115 and a band 175. The headset 105 includes many of the same components described above with reference to FIG. 1A, but modified to integrate with the HMD form factor. For example, the HMD includes a display assembly, a DCA, an audio system, and a position sensor 190. FIG. 1B shows the illuminator 140, a plurality of the speakers 160, a plurality of the imaging devices 130, a plurality of acoustic sensors 180, and the position sensor 190. The speakers 160 may be located in various locations, such as coupled to the band 175 (as shown), coupled to front rigid body 115, or may be configured to be inserted within the ear canal of a user.

Figure 2:
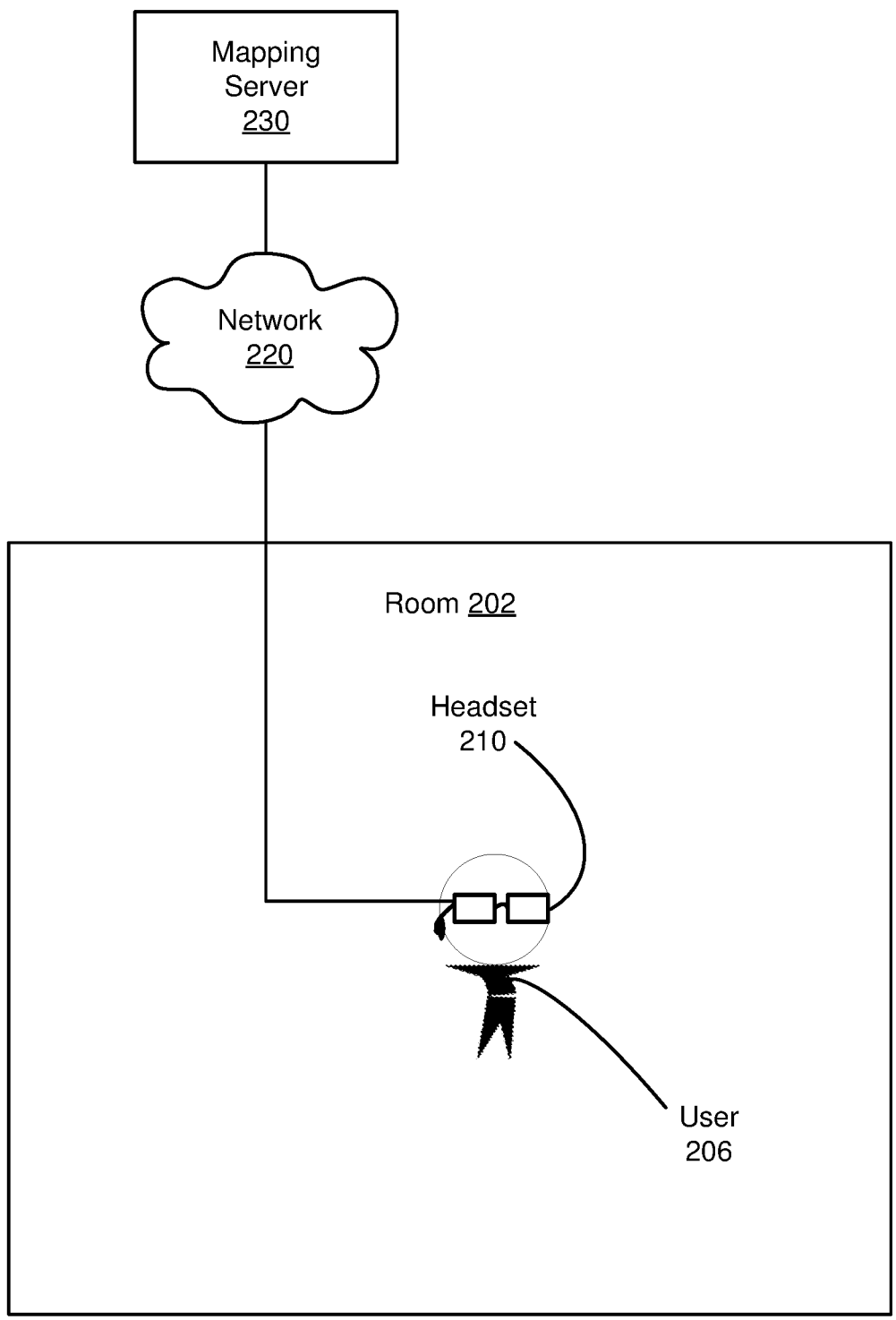
FIG. 2 is a block diagram of a system environment for a headset, in accordance with one or more embodiments.

FIG. 2 is a block diagram of a system 200 for a headset 210, in accordance with one or more embodiments. The system 200 includes the headset 210 that can be worn by a user 206 in a room 202. The headset 210 is connected to a mapping server 230 via a network 220.

The network 220 connects the headset 210 to the mapping server 230. The network 220 may include any combination of local area and/or wide area networks using both wireless and/or wired communication systems. For example, the network 220 may include the Internet, as well as mobile telephone networks. In one embodiment, the network 220 uses standard communications technologies and/or protocols. Hence, the network 220 may include links using technologies such as Ethernet, 802.11, worldwide interoperability for microwave access (WiMAX), 2G/3G/4G mobile communications protocols, digital subscriber line (DSL), asynchronous transfer mode (ATM), InfiniBand, PCI Express Advanced Switching, etc. Similarly, the networking protocols used on the network 220 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 220 can be represented using technologies and/or formats including image data in binary form (e.g. Portable Network Graphics (PNG)), hypertext markup language (HTML), extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. The network 220 may also connect multiple headsets located in the same or different rooms to the same mapping server 230.

The headset 210 may receive, from the mapping server 230 (e.g., via the network 220) an indication (e.g., an identifier) about an acoustic model that accounts for a physical geometry of the room 202 and a plurality of acoustic model parameters related to the acoustic model. The headset 210 may estimate one or more acoustic parameters based in part on a target location in the room 202 for a virtual sound source, a position of the headset 210 in the room 202, the plurality of acoustic model parameters and the indication about the acoustic model. The headset 210 may then generate a sound filter using the estimated one or more acoustic parameters, and audio content for the user 206 using the sound filter. In some embodiments, the headset 210 estimates a plurality of binaural acoustic parameters based in part on a target location in the room 202 for a virtual sound source, a position of the headset 210 in the room 202, the plurality of parameters and the indication about the acoustic model. The headset 210 may generate a respective sound filter for each ear of the user 206 using one or more corresponding parameters of the plurality of binaural acoustic parameters. After that, the headset 210 generates the audio content for each ear of the user 206 using the respective sound filter. The headset 210 may be an embodiment of the headset 100 of FIG. 1A or an embodiment of the headset 105 of FIG. 1B. Additional details regarding operations of the headset 210 are discussed below in connection with FIGS. 6A-6C and FIG. 7.

The mapping server 230 facilitates creation of audio content for the headset 210. The mapping server 230 includes a non-transitory computer-readable storage medium, which may store, for each configuration of each physical space, an indication about an acoustic model that accounts for a physical geometry each physical space and a plurality of acoustic model parameters. The mapping server 230 may provide the plurality of parameters and the indication about the acoustic model to the headset 210 (e.g., via the network 220) for estimation of a set of acoustic parameters and generating audio content at the headset 210 using the set of acoustic parameters. Alternatively, the mapping server 230 may generate an audio signal using the set of acoustic parameters determined at the mapping server and provide the audio signal to the headset 210 for rendering. In some embodiments, some or all of the components of the mapping server 230 may be integrated with the headset 210 and/or another device (e.g., a console) connected to the headset 210 via a wired connection (not shown in FIG. 2). Additional details regarding operations and components of the mapping server 230 are discussed below in connection with FIGS. 5A-5B and FIGS. 6A-6B.

Figure 3:
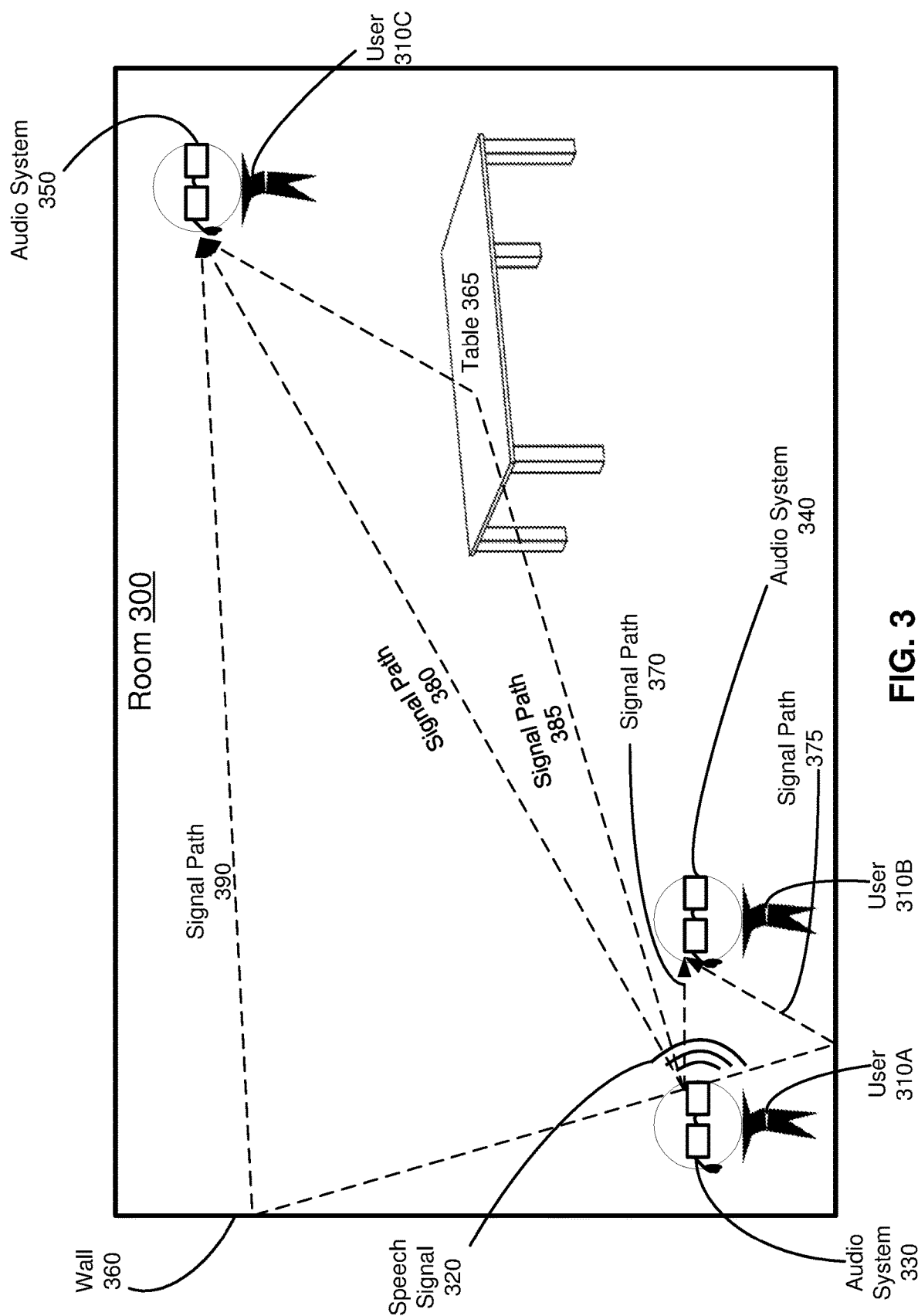
FIG. 3 illustrates the effects of surfaces in a room on the propagation of speech signals between an origin audio assembly and a receiving audio assembly, according to one or more embodiments.

FIG. 3 illustrates the effects of surfaces in a room on the propagation of speech signals between an origin audio system and a receiving audio system, according to one or more embodiments. An audio analysis system comprises at least two audio systems within a room. The illustrated embodiment comprises three audio systems (i.e., as part of headsets) used by three users. A user 310A uses an audio system 330, a user 310B uses an audio system 340, and a user 310C uses an audio system 350. Each user and their audio system is positioned with a room 300 bounded by a wall 360. In addition to the three users and their audio systems, the room 300 also contains a table 365. The audio systems 330, 340, 360 may be positioned in alternate locations within the room than those described with reference to FIG. 3. And the room may have a different geometry and/or objects than those described with reference to FIG. 3.

In the illustrated configuration, the user 310A generates a speech signal 320. A speech signal represents any sound emitted by a user which disperses throughout a room. The speech signal 320 propagates away from the user 310A through the room over various signal paths. The speech signal can reach a receiving audio system (e.g., audio systems 340, 350) via multiple paths (e.g., signal paths 370, 375, 380, 385, and 390). Depending on the positions of the users 310B and 310C and the corresponding audio systems 340 and 350, signal paths may travel various distances and reflect off of various surfaces before being recorded by a receiving audio system. Accordingly, signal paths traveling from an origin audio system to a receiving audio system may follow a direct path or an indirect path. Direct paths travel directly from a speaking user to a receiving audio system, for example the signal path 370 travels from the position of the audio system 330 directly to the position of the audio system 340 and signal path 380 travels from the position of the audio system 330 directly to the position of the audio system 350. In other embodiments, the path travels from the position of the origin audio system and reflects off of surfaces within the room before reaching the position of a receiving audio system. Such paths are referred to as indirect paths. The room includes some amount of reverberation. Reverberation is caused by sound (e.g., speech signal 320) in the room and a large number of reflections build up and decay as the sound is absorbed by the surfaces of objects/walls in the room. An estimated reverberation time is a measure of how long the decay takes.

Since the user 310A emits the speech signal 320, the audio system 330, which is closest in proximity to the user 310A, is the first audio system to record a recording of the speech signal 320. Accordingly, the audio system 330 is considered the origin audio system. Before each signal path travels beyond the local area of the audio system 330, the audio system 330 records the emitted speech signal 320.

In the illustrated configuration, the audio system 340 is positioned a shorter distance away from the audio system 330 (i.e., the origin audio system) than the audio system 350. In embodiments in which the system comprises multiple receiving users or receiving audio systems, for example FIG. 3, the speech signals recorded by each receiving audio system may be aggregated to improve the accuracy of the analysis performed on the signals. Such an embodiment addresses limitations within the frequency range of either the origin audio system, the receiving audio systems, or both.

In FIG. 3, the speech signal 320 propagates along signal path 370 traveling directly to the position of the audio system 340. Additionally, the speech signal propagates along the signal path 375. A speech signal 320 propagating along the signal path 375 encounters and reflects off the surface of the wall 360 before being redirected towards the position of the audio system 340. In addition, the signal paths 370 and 375, the audio system 340 may receive additional speech signals (not shown) at various directions of arrival. Therefore, the audio system 340 is considered a receiving audio system. Using the speech signals received over direct paths and indirect paths, the audio system 340 generates a recording of at least a portion of the speech which accounts for the effects of the room on sound propagation.

The speech signal 320 disperses throughout the room in directions beyond the signal paths 370 and 375. For example, the speech signal 320 also propagates over the signal paths 380, 385, and 390 to travel to the position of the audio system 350. The signal path 380, a direct path, travels directly from the position of the audio system 330 to the position of the audio system 350. The signal path 385 and the signal path 390 are indirect paths reflecting off of the table 365 and a surface of the wall 360, respectively, before reaching the audio system 350. In addition to the first speech signal 370 and the second speech signal 375, the first receiving audio system may receive several additional speech signals (not shown) at various directions of arrival. Therefore, the audio system 350 is also considered a receiving an audio system. The receiving audio system 340 also generates a complete recording of the sound using the direct speech signals 370 and indirect speech signals 375.

In the illustrated configuration, each audio system is positioned in a room, an audio controller (not shown in FIG. 3) may be located on one or all of the headsets, some other device within the room (e.g., a console), a remote server, or some combination thereof. Each audio system communicates recordings of speech signals to the controller.

The audio controller (not shown in FIG. 3) receives the recording recorded by the origin audio system (e.g., audio system 330) which represents the speech signal before propagating throughout the room and recordings form the receiving audio systems (e.g., audio systems 340, 350). The audio controller selects portions of the recording from origin audio system and a receiving audio system. The audio controller uses the selected portions of the recordings to determine an acoustic transfer function for the room which can be used to determine an impulse response for the room (i.e., a room-impulse response).

Recordings of the speech signal 320 provides insight into how the layout and physical properties of the room affect sound propagation within the room. The room and objects in the room are composed of materials that have specific acoustic absorption properties that affect the room-impulse response. For example, a room composed of materials that absorb sound (e.g., a ceiling made of acoustic tiles and/or foam walls) will likely have a much different room impulse response than a room without those materials (e.g., a room with a plaster ceiling and concrete walls). Reverberations are much more likely to occur in the latter case as sound is not as readily absorbed by the room materials.

For each position of an audio system, the audio controller determines a room impulse response. A room impulse response is a representation of acoustic effects of an environment, for a given position of a source (e.g., a speaking user) and an audio system within a local area, as sound propagates from the source to the audio system. Accordingly, for a given room there is a plurality of different room impulse responses that each correspond to different relative locations of the source and the audio system within the room. For example, the audio controller determines a room impulse based on the illustrated positions of the audio systems 330 and 350. However, if the audio system 350 moves to a different position within the room, the audio controller determines a different room impulse response based on a different set of direct and indirect signals. In one embodiment, room impulse responses may be implemented to improve the accuracy of acoustic parameters that are generally constant throughout the room, for example reverberation time. Acoustic parameters generally constant throughout the room, may also hold constant as properties between different room impulse responses. In alternate embodiments, the audio controller uses multiple room impulse responses to generate a room impulse response model for the room. The room impulse response model comprises corresponding room impulse responses for some or all of the various position of a virtual speech source and an audio system within the room. The room impulse response model may be generated by extrapolating additional room impulse responses using the determined room impulse response models. The additional room impulse responses correspond to different locations of the source and/or the audio system than those used to determine the plurality of room impulse responses.

The room-impulse response model may include a map of position-dependent parameters, for example early decay time and clarity. In some embodiments, information describing the direction of arrival of speech signals are determined based on response signals recorded by audio systems comprising multiple acoustic sensors.

Based on the room impulse response, the audio controller determines one or more acoustic properties of the room. Using the one or more acoustic parameters, in some embodiments, the audio analysis system may generate a virtual representation of the room 300 with an accurate simulation of the sound propagation effects based on the acoustic parameters of the room. Moreover, in embodiments, where the audio system has head-related transfer functions (HRTFs) for the user, the audio system may use the HRTFs and the one or more acoustic properties to place virtual audio sources within the room in a perceptually convincing manner (i.e., sound appears to originate from the virtual object).

Figure 4:
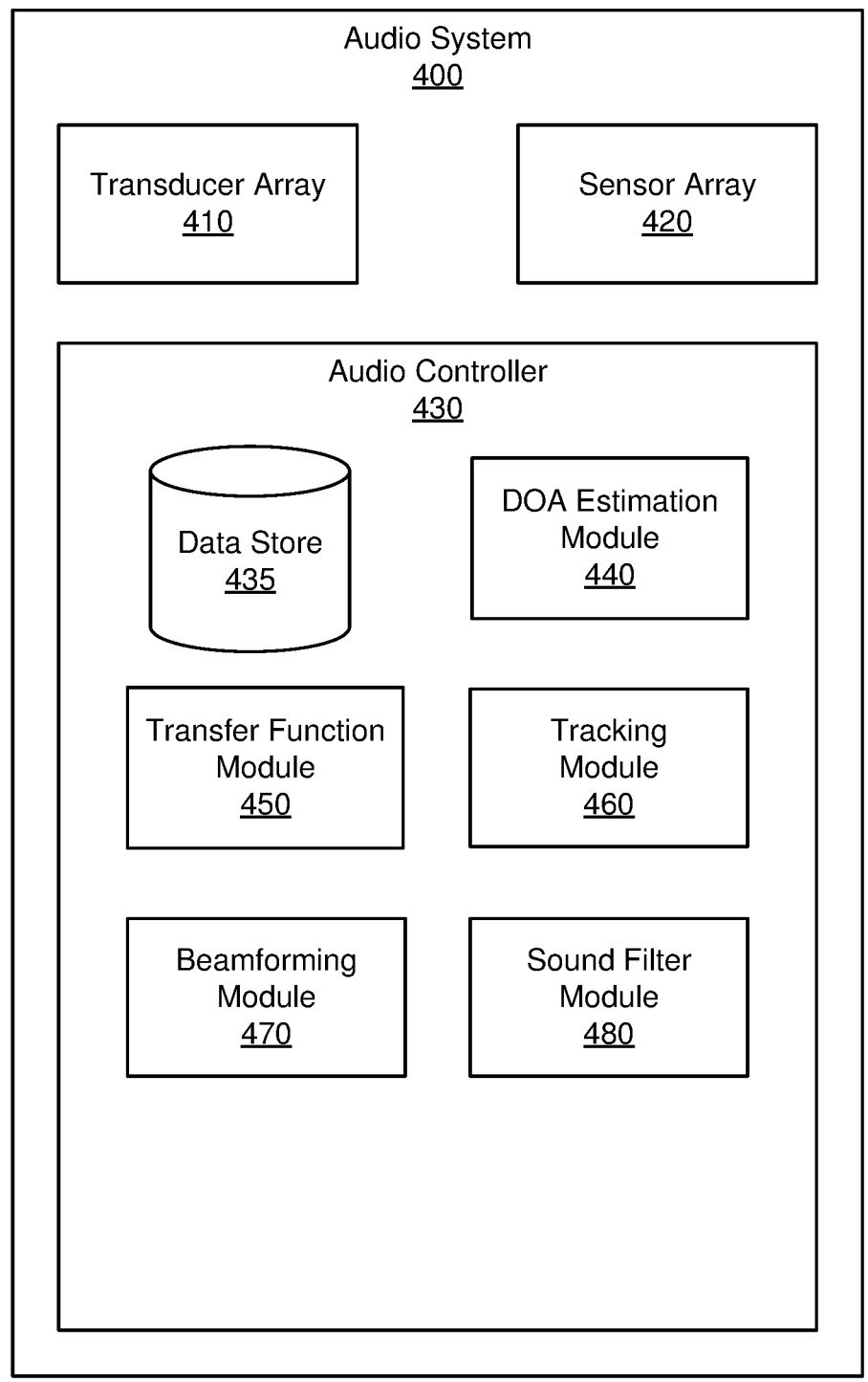
FIG. 4 is a block diagram of an audio system, in accordance with one or more embodiments.

FIG. 4 is a block diagram of an audio system 400, in accordance with one or more embodiments. The audio system in FIG. 1A or FIG. 1B may be an embodiment of the audio system 400. Also, each of the audio systems 330, 340, 350 in FIG. 3 may be an embodiment of the audio system 400. The audio system 400 generates one or more acoustic transfer functions for a user. The audio system 400 may then use the one or more acoustic transfer functions to generate audio content for the user. In the embodiment of FIG. 4, the audio system 400 includes a transducer array 410, a sensor array 420, and an audio controller 430. Some embodiments of the audio system 400 have different components than those described here. Similarly, in some cases, functions can be distributed among the components in a different manner than is described here.

The transducer array 410 is configured to present audio content. The transducer array 410 includes a plurality of transducers. A transducer is a device that provides audio content. A transducer may be, e.g., a speaker (e.g., the speaker 160), a tissue transducer (e.g., the tissue transducer 170), some other device that provides audio content, or some combination thereof. A tissue transducer may be configured to function as a bone conduction transducer or a cartilage conduction transducer. The transducer array 410 may present audio content via air conduction (e.g., via one or more speakers), via bone conduction (via one or more bone conduction transducer), via cartilage conduction audio system (via one or more cartilage conduction transducers), or some combination thereof. In some embodiments, the transducer array 410 may include one or more transducers to cover different parts of a frequency range. For example, a piezoelectric transducer may be used to cover a first part of a frequency range and a moving coil transducer may be used to cover a second part of a frequency range.

The bone conduction transducers generate acoustic pressure waves by vibrating bone/tissue in the user's head. A bone conduction transducer may be coupled to a portion of a headset, and may be configured to be behind the auricle coupled to a portion of the user's skull. The bone conduction transducer receives vibration instructions from the audio controller 430, and vibrates a portion of the user's skull based on the received instructions. The vibrations from the bone conduction transducer generate a tissue-borne acoustic pressure wave that propagates toward the user's cochlea, bypassing the eardrum.

The cartilage conduction transducers generate acoustic pressure waves by vibrating one or more portions of the auricular cartilage of the ears of the user. A cartilage conduction transducer may be coupled to a portion of a headset, and may be configured to be coupled to one or more portions of the auricular cartilage of the ear. For example, the cartilage conduction transducer may couple to the back of an auricle of the ear of the user. The cartilage conduction transducer may be located anywhere along the auricular cartilage around the outer ear (e.g., the pinna, the tragus, some other portion of the auricular cartilage, or some combination thereof). Vibrating the one or more portions of auricular cartilage may generate: airborne acoustic pressure waves outside the ear canal; tissue born acoustic pressure waves that cause some portions of the ear canal to vibrate thereby generating an airborne acoustic pressure wave within the ear canal; or some combination thereof. The generated airborne acoustic pressure waves propagate down the ear canal toward the ear drum.

The transducer array 410 generates audio content in accordance with instructions from the audio controller 430. In some embodiments, the audio content is spatialized. Spatialized audio content is audio content that appears to originate from a particular direction and/or target region (e.g., an object in the local area and/or a virtual object). For example, spatialized audio content can make it appear that sound is originating from a virtual singer across a room from a user of the audio system 400. The transducer array 410 may be coupled to a wearable device (e.g., the headset 100 or the headset 105). In alternate embodiments, the transducer array 410 may be a plurality of speakers that are separate from the wearable device (e.g., coupled to an external console).

The sensor array 420 detects sounds within a local area surrounding the sensor array 420. The sensor array 420 may include a plurality of acoustic sensors that each detect air pressure variations of a sound wave and convert the detected sounds into an electronic format (analog or digital). The plurality of acoustic sensors may be positioned on a headset (e.g., headset 100 and/or the headset 105), on a user (e.g., in an ear canal of the user), on a neckband, or some combination thereof. An acoustic sensor may be, e.g., a microphone, a vibration sensor, an accelerometer, or any combination thereof. In some embodiments, the sensor array 420 is configured to monitor the audio content generated by the transducer array 410 using at least some of the plurality of acoustic sensors. Increasing the number of sensors may improve the accuracy of information (e.g., directionality) describing a sound field produced by the transducer array 410 and/or sound from the local area.

The audio controller 430 controls operation of the audio system 400. In the embodiment of FIG. 4, the audio controller 430 includes a data store 435, a DOA estimation module 440, a transfer function module 450, a tracking module 460, a beamforming module 470, and a sound filter module 480. The audio controller 430 may be located inside a headset, in some embodiments. Some embodiments of the audio controller 430 have different components than those described here. Similarly, functions can be distributed among the components in different manners than described here. For example, some functions of the audio controller 430 may be performed external to the headset. The user may opt in to allow the audio controller 430 to transmit data captured by the headset to systems external to the headset, and the user may select privacy settings controlling access to any such data. The audio controller 430 may also receive data from systems external to the headset.

The data store 435 stores data for use by the audio system 400. Data in the data store 435 may include sounds recorded in the local area of the audio system 400, audio content, head-related transfer functions (HRTFs), transfer functions for one or more sensors, array transfer functions (ATFs) for one or more of the acoustic sensors, sound source locations, direction of arrival estimates, sound filters, at least one indication (e.g. an identifier) about at least one acoustic model, acoustic model parameters related to each of the at least one acoustic model, and other data relevant for use by the audio system 400, or any combination thereof.

The user may opt-in to allow the data store 435 to record data captured by the audio system 400. In some embodiments, the audio system 400 may employ always on recording, in which the audio system 400 records all sounds captured by the audio system 400 in order to improve the experience for the user. The user may opt in or opt out to allow or prevent the audio system 400 from recording, storing, or transmitting the recorded data to other entities.

The DOA estimation module 440 is configured to localize sound sources in the local area based in part on information from the sensor array 420. Localization is a process of determining where sound sources are located relative to the user of the audio system 400. The DOA estimation module 440 performs a DOA analysis to localize one or more sound sources within the local area. The DOA analysis may include analyzing the intensity, spectra, and/or arrival time of each sound at the sensor array 420 to determine the direction from which the sounds originated. In some cases, the DOA analysis may include any suitable algorithm for analyzing a surrounding acoustic environment in which the audio system 400 is located.

For example, the DOA analysis may be designed to receive input signals from the sensor array 420 and apply digital signal processing algorithms to the input signals to estimate a direction of arrival. These algorithms may include, for example, delay and sum algorithms where the input signal is sampled, and the resulting weighted and delayed versions of the sampled signal are averaged together to determine a DOA. A least mean squared (LMS) algorithm may also be implemented to create an adaptive filter. This adaptive filter may then be used to identify differences in signal intensity, for example, or differences in time of arrival. These differences may then be used to estimate the DOA. In another embodiment, the DOA may be determined by converting the input signals into the frequency domain and selecting specific bins within the time-frequency (TF) domain to process. Each selected TF bin may be processed to determine whether that bin includes a portion of the audio spectrum with a direct path audio signal. Those bins having a portion of the direct-path signal may then be analyzed to identify the angle at which the sensor array 420 received the direct-path audio signal. The determined angle may then be used to identify the DOA for the received input signal. Other algorithms not listed above may also be used alone or in combination with the above algorithms to determine DOA.

In some embodiments, the DOA estimation module 440 may also determine the DOA with respect to an absolute position of the audio system 400 within the local area. The position of the sensor array 420 may be received from an external system (e.g., some other component of a headset, an artificial reality console, a mapping server, a position sensor (e.g., the position sensor 190), etc.). The external system may create a virtual model of the local area, in which the local area and the position of the audio system 400 are mapped. The received position information may include a location and/or an orientation of some or all of the audio system 400 (e.g., of the sensor array 420). The DOA estimation module 440 may update the estimated DOA based on the received position information.

The transfer function module 450 is configured to generate one or more acoustic transfer functions. Generally, a transfer function is a mathematical function giving a corresponding output value for each possible input value. Based on parameters of the detected sounds, the transfer function module 450 generates one or more acoustic transfer functions associated with the audio system. The acoustic transfer functions may be array transfer functions (ATFs), head-related transfer functions (HRTFs), other types of acoustic transfer functions, or some combination thereof. An ATF characterizes how the microphone receives a sound from a point in space.

An ATF includes a number of transfer functions that characterize a relationship between the sound source and the corresponding sound received by the acoustic sensors in the sensor array 420. Accordingly, for a sound source there is a corresponding transfer function for each of the acoustic sensors in the sensor array 420. And collectively the set of transfer functions is referred to as an ATF. Accordingly, for each sound source there is a corresponding ATF. Note that the sound source may be, e.g., someone or something generating sound in the local area, the user, or one or more transducers of the transducer array 410. The ATF for a particular sound source location relative to the sensor array 420 may differ from user to user due to a person's anatomy (e.g., ear shape, shoulders, etc.) that affects the sound as it travels to the person's ears. Accordingly, the ATFs of the sensor array 420 are personalized for each user of the audio system 400.

In some embodiments, the transfer function module 450 determines one or more HRTFs for a user of the audio system 400. The HRTF characterizes how an ear receives a sound from a point in space. The HRTF for a particular source location relative to a person is unique to each ear of the person (and is unique to the person) due to the person's anatomy (e.g., ear shape, shoulders, etc.) that affects the sound as it travels to the person's ears. In some embodiments, the transfer function module 450 may determine HRTFs for the user using a calibration process. In some embodiments, the transfer function module 450 may provide information about the user to a remote system. The user may adjust privacy settings to allow or prevent the transfer function module 450 from providing the information about the user to any remote systems. The remote system determines a set of HRTFs that are customized to the user using, e.g., machine learning, and provides the customized set of HRTFs to the audio system 400.

The tracking module 460 is configured to track locations of one or more sound sources. The tracking module 460 may compare current DOA estimates and compare them with a stored history of previous DOA estimates. In some embodiments, the audio system 400 may recalculate DOA estimates on a periodic schedule, such as once per second, or once per millisecond. The tracking module may compare the current DOA estimates with previous DOA estimates, and in response to a change in a DOA estimate for a sound source, the tracking module 460 may determine that the sound source moved. In some embodiments, the tracking module 460 may detect a change in location based on visual information received from the headset or some other external source. The tracking module 460 may track the movement of one or more sound sources over time. The tracking module 460 may store values for a number of sound sources and a location of each sound source at each point in time. In response to a change in a value of the number or locations of the sound sources, the tracking module 460 may determine that a sound source moved. The tracking module 460 may calculate an estimate of the localization variance. The localization variance may be used as a confidence level for each determination of a change in movement.

The beamforming module 470 is configured to process one or more ATFs to selectively emphasize sounds from sound sources within a certain area while de-emphasizing sounds from other areas. In analyzing sounds detected by the sensor array 420, the beamforming module 470 may combine information from different acoustic sensors to emphasize sound associated from a particular region of the local area while deemphasizing sound that is from outside of the region. The beamforming module 470 may isolate an audio signal associated with sound from a particular sound source from other sound sources in the local area based on, e.g., different DOA estimates from the DOA estimation module 440 and the tracking module 460. The beamforming module 470 may thus selectively analyze discrete sound sources in the local area. In some embodiments, the beamforming module 470 may enhance a signal from a sound source. For example, the beamforming module 470 may apply sound filters which eliminate signals above, below, or between certain frequencies. Signal enhancement acts to enhance sounds associated with a given identified sound source relative to other sounds detected by the sensor array 420.

The sound filter module 480 determines sound filters for the transducer array 410. In some embodiments, the sound filters cause the audio content to be spatialized, such that the audio content appears to originate from a target region. The sound filter module 480 may use HRTFs and/or acoustic parameters to generate the sound filters. The acoustic parameters describe acoustic properties of the local area. The acoustic parameters may include, e.g., a reverberation time, a reverberation level, a room impulse response, etc. In some embodiments, the sound filter module 480 calculates one or more of the acoustic parameters. In some embodiments, the sound filter module 480 requests information from a mapping server used for calculating the one or more acoustic parameters (e.g., as described below with regard to FIG. 5A and FIG. 6C). The sound filter module 480 provides the determined sound filters to the transducer array 410. In some embodiments, the sound filters applied at the transducer array 410 may cause amplification or attenuation of sounds as a function of frequency.

Figure 5A:
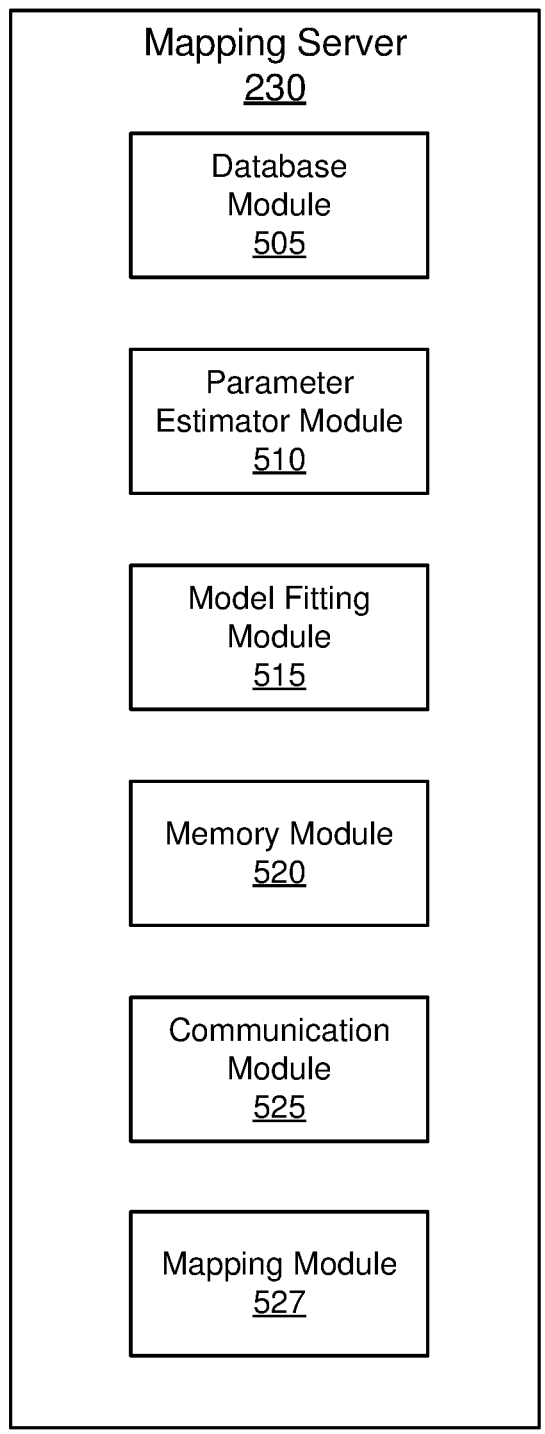
FIG. 5A is a block diagram of a mapping server, in accordance with one or more embodiments.

FIG. 5A is a block diagram of the mapping server 230, in accordance with one or more embodiments. In the embodiment of FIG. 5A, the mapping server 230 includes a database module 505, a parameter estimator module 510, a model fitting module 515, a memory module 520, a communication module 525, and a mapping module 527. Some embodiments of the mapping server 230 have different components than those described here. Similarly, in some cases, functions can be distributed among the components in a different manner than is described here.

The database module 505 stores a respective set of room impulse responses for a respective set of discrete locations within a local area of a plurality of local areas where an audio system can be located. Sets of room impulse responses stored in the database module 505 may be obtained from one or more audio systems that generate and/or measure the sets of room impulse responses. In some embodiments, at least one room impulse response in the set is measured by the audio system 400, obtained from the audio system 400 and stored at the database module 505. In some other embodiments, at least one room impulse response in the set is estimated by utilizing audio systems different than the audio system 400. For example, the at least one room impulse response can be estimated (e.g., for a current user's location in the local area relative to a location of a sound source in the local area) based on a first audio signal originated from the location of the sound source and recorded by a first audio system and a second audio signal received at the user's location and recorded by a second audio system. Some other methods can be also used for estimating one or more room impulse responses in the set of room impulse responses, e.g., as described in U.S. application Ser. No. 16/180,165 (issued as U.S. Pat. No. 10,440,498) incorporated herein by reference in its entirety. The database module 505 may be implemented as, e.g., a non-transitory computer-readable storage medium. In some embodiments, the database module 505 is part of the memory module 520.

A room impulse response for a discrete location in a local area that includes an audio system can be characterized and rendered (e.g., in the time domain) using modal synthesis. In accordance with the modal synthesis, the room impulse response can be represented as a sum of individual acoustic modes at the discrete location, i.e., as a sum of frequency-specific acoustic responses of the local are that are dictated by, e.g., a size of the local area, a shape of the local area, material properties of the local area, some other property of the local area, or combination thereof. An acoustic mode measured at the discrete location can be represented using a plurality of modal parameters, e.g., an amplitude, a frequency and a decay factor for the discrete location and for that specific acoustic mode. Thus, in accordance with the modal synthesis, the room impulse response in the time domain can be defined as:

$$h(x, y, z, t) = \sum_{m=1}^{M} \gamma_m(x, y, z) e^{(j\omega_m - \alpha_m)t}, \quad (1)$$

where (x, y, z) are three-dimensional coordinates of the discrete location in time t; h(x, y, z, t) is the room impulse response for the discrete location (x, y, z) in time t; m=1, . . . , M is an index (identifier) for each acoustic mode (e.g., limited to a total of M); $\gamma_m(x, y, z)$ is an amplitude for an acoustic mode m as a function of the discrete location (x, y, z); $\omega_m$ is a frequency for the acoustic mode m; and $\alpha_m$ is a decay factor for the acoustic mode m. It should be observed from Eq. (1) that the amplitude depends on the discrete location in the local area, whereas the frequency and the decay factor are same for all discrete location in the local area for the given acoustic mode m. As the set of room impulse responses for the set of discrete locations within the local area is available at the database module 505 and by knowing that each room impulse response in the set can be characterized based on Eq. (1), a plurality of modal parameters (e.g., the parameters $\gamma_m$, $\omega_m$ and $\alpha_m$ in Eq. (1)) can be estimated from the set of room impulse responses.

The parameter estimator module 510 estimates the plurality of modal parameters for the set of discrete locations within the local area using the set of room impulse responses from the database module 505 for the set of discrete locations. The plurality of modal parameters comprises a respective amplitude, a frequency and a decay factor for each discrete location in the set of discrete locations for a corresponding acoustic mode. As aforementioned, the respective amplitude is a function of each discrete location, the frequency is same for all discrete locations in the set of discrete locations, and the decay factor is same for all discrete locations in the set of discrete locations. The parameter estimator module 510 may estimate the plurality of modal parameters for the set of discrete locations by applying a signal classification based algorithm to the set of room impulse responses. The signal classification based algorithm may be, e.g., the estimation of signal parameters via rotational invariant techniques (ESPRIT) algorithm, the multiple signal classification (MUSIC) algorithm, some other signal classification algorithm, or combination thereof. In some embodiments, quality and computational performance for the estimation of modal parameters can be adjusted dynamically by using a smaller subset M' of the M acoustic modes. The M' acoustic modes may be selected according to, e.g., their perceptual importance, which may be determined by the parameter estimator module 510 during the estimation of modal parameters.

The model fitting module 515 generates a plurality of acoustic model parameters by fitting the plurality of modal parameters obtained from the parameter estimator module 510 to an acoustic model that accounts for a physical geometry and/or acoustic properties of the local area. Depending on available data and a priori information known about the local area, different acoustic models for the local area can be used. In one embodiment, for the local area being a rectangular room with rigid walls, an acoustic model for an acoustic mode m can be used as:

$$\gamma_m(x,y,z) = C_m \cos(k_{x,m})\cos(k_{y,m})\cos(k_{z,m}), \quad (2)$$

where $\gamma_m(x, y, z)$ is an amplitude for the acoustic mode m as a function of the discrete location (x, y, z); $k_{x,m}$ is a wave number of the acoustic mode m in dimension x; $k_{y,m}$ is a wave number of the acoustic mode m in dimension y; $k_{z,m}$ is a wave number of the acoustic mode m in dimension z; and $C_m$ is a constant for the acoustic mode m. The parameters $k_{x,m}$, $k_{y,m}$, $k_{z,m}$ and $C_m$ represent acoustic model parameters. In another embodiment, for the local area being a rectangular room with non-rigid walls, a two-dimensional acoustic model for an acoustic mode m can be used as:

$$\gamma_m(x,y) = C_{1,m} e^{-j(k_{x,m}x + k_{y,m}y)} D_{1,m} e^{j(k_{x,m}x + k_{y,m}y)} + C_{2,m} e^{-j(k_{x,m}x - k_{y,m}y)} + D_{2,m} e^{j(k_{x,m}x - k_{y,m}y)}, \quad (3)$$

where $\gamma_m(x, y)$ is an amplitude for an acoustic mode m as a function of a two-dimensional discrete location (x, y) of the local area; $C_{1,m}$, $D_{1,m}$, $C_{2,m}$, and $D_{2,m}$ are different constants for the acoustic mode m; $k_{x,m}$ is a wave number of the acoustic mode m in dimension x; and $k_{y,m}$ is a wave number of the acoustic mode m in dimension y. The parameters $k_{x,m}$, $k_{y,m}$, $C_{1,m}$, $D_{1,m}$, $C_{2,m}$, and $D_{2,m}$ represent acoustic model parameters. The acoustic model defined by Eq. (3) can be extended for a three-dimensional discrete location (x, y, z) of the local area.

Other local areas (e.g., rooms) with other geometries and acoustic properties can utilized some other acoustic models with various number of acoustic model parameters. In some embodiments, the other acoustic models, similarly as the acoustic models defined by Eq. (2) and Eq. (3), comprises a combination of a plurality of cosine functions where the combination is defined based on the acoustic model parameters, e.g., the superposition of weighted cosine functions depending on the wave numbers for x, y and z spatial dimensions.

To generate the plurality of acoustic model parameters, the model fitting module 515 may perform a non-linear optimization algorithm to fit the plurality of modal parameters to an acoustic model (e.g., the acoustic model defined by Eq. (2), the acoustic model defined by Eq. (3), or some other acoustic model). As defined in Eq. (2) and Eq. (3), the plurality of acoustic model parameters comprises a plurality of wave numbers associated with physical dimensions of the local area and at least one constant value, where the wave numbers and the at least one constant are an integral part of the corresponding acoustic model. In some embodiments, the parameter estimator module 510 and the model fitting module 515 are part of a single processor (controller) module.

The memory module 520 is a non-transitory computer-readable storage medium that stores the plurality of acoustic model parameters generated by the model fitting module 515. The memory module 520 further stores an indication (e.g., an identifier) about an acoustic model associated with the plurality of acoustic model parameters (e.g., an identifier of Eq. (2), an identifier of Eq. (3), or some other identifier of a mathematical expression of the acoustic model). Details regarding storage of the plurality of acoustic model parameters for each acoustic model of a local area (physical space) and the indication about the acoustic model for the physical space are discussed below in connection with FIG. 5B.

The communication module 525 is a transceiver module that facilitates communication (e.g., wireless or wired) between the mapping server 230 and the audio system 400, e.g., mounted on a headset located in the local area or to be located in the local area within a threshold time period. The communication module 525 receives a request signal from the audio system 400. The request signal may include information about a physical geometry and possibly about at least one other physical property of the local area (e.g., information about acoustic materials of surfaces in the local area) so that the mapping server 230 can associate the local area to a corresponding acoustic model. The communication module 525 may forward the request signal to the mapping module 527. Furthermore, the communication module 525 may receive, from the mapping module 527, information about the plurality of acoustic model parameters and the indication about the acoustic model associated with the local area, and forward this information to the audio system 400. Audio content is presented by the audio system 400 using the plurality of acoustic model parameters and the indication about the acoustic model.

The mapping module 527 maps the information about the physical geometry of the local area received from the communication module 525 within the request signal to a location of a virtual model that stores information about an acoustic model accounting for the physical geometry of the local area. To determine the location of the virtual model, the mapping module 527 searches through the virtual model to find mapping between (i) information that include at least e.g., information about geometry of surfaces of the local area and information about acoustic materials of the surfaces and (ii) a corresponding configuration of the local area within the virtual model. The mapping is performed by matching the geometry and/or acoustic materials information of the received information with geometry and/or acoustic materials information that is stored as a part of a specific configuration of the local area within the virtual model. The corresponding configuration of the physical space within the virtual model corresponds to an acoustic model of the local area where the audio system 400 is currently located or is going to be located within a threshold time period.

FIG. 5B is an example of a virtual model 530 describing physical spaces (local areas) and acoustic properties of the physical spaces, in accordance with one or more embodiments. The virtual model 530 may be stored in the memory module 520. The virtual model 530 may represent geographic information storage area in the memory module 520 that stores geographically tied quadruplets of information for all physical spaces in the world, i.e., a physical space identifier (ID) 535, a space configuration ID 540, a set of acoustic model parameters 545, and an acoustic model ID 550.

The virtual model 530 includes a listing of possible physical spaces S1, S2, . . . , Sn, each identified by a unique physical space ID 535. A physical space ID 535 uniquely identifies a particular type of physical space. The physical space ID 535 may include, e.g., a conference room, a bathroom, a hallway, an office, a bedroom, a dining room, a living room, some other type of physical space, or some combination thereof. Thus, each physical space ID 535 corresponds to one particular type of physical space.

Each physical space ID 535 is associated with one or more space configuration IDs 540. Each space configuration ID 540 corresponds to a configuration of a physical space identified by the physical space ID 535 that has a specific acoustic condition. The space configuration ID 540 may include, e.g., an identification about a human occupancy level in the physical space, an identification about conditions of components of the physical space (e.g., open/closed windows, open/closed door, etc.), an indication about acoustic materials of objects and/or surfaces in the physical space, an indication about locations of a source and a receiver in the same space, some other type of configuration indication, or some combination thereof. In some embodiments, different configurations of the same physical space can be due to various different conditions in the physical space. Different configurations of the same physical space may be related to, e.g., different occupancies of the same physical space, different conditions of components of the same physical space (e.g., open/closed windows, open/closed door, etc.), different acoustic materials of objects and/or surfaces in the same physical space, different locations of source/receiver in the same physical space, some other feature of the physical space, or some combination thereof. Each space configuration ID 540 may be represented as a unique code ID (e.g., a binary code) that identifies a configuration of a physical space ID 535. For example, as illustrated in FIG. 5B, the physical space S1 can be associated with p different space configurations S1C1, S1C2, . . . , S1Cp each representing a different acoustic condition of the same physical space S1; the physical space S2 can be associated with q different space configurations S2C1, S2C2, . . . , S2Cq each representing a different acoustic condition of the same physical space S2; the physical space Sn can be associated with r different space configurations SnC1, SnC2, . . . , SnCr each representing a different acoustic condition of the same physical space Sn. The mapping module 527 may search through the virtual model 530 to find an appropriate space configuration ID 540 based on information of a physical space received from the audio system 400.

Each space configuration ID 540 has a specific acoustic condition and can be uniquely modeled. Because of that, each space configuration ID 540 is associated with a corresponding set of acoustic model parameters 545 stored in a corresponding location of the virtual model 530. Also, each physical space ID 535 is associated with a corresponding acoustic model ID 550 accounting for a physical geometry of a physical space indicated by a respective physical space ID 535. The corresponding set of acoustic model parameters 545 along with corresponding acoustic model ID 550 define a unique acoustic model for a respective space configuration ID 540. As illustrated in FIG. 5B, p different space configurations S1C1, S1C2, . . . , S1Cp of the same physical space S1 are associated with p different sets of acoustic model parameters {AM_P11}, {AM_P12}, . . . , {AM_P1$p$} and with acoustic model ID AM1, e.g., ID of Eq. (2), ID of Eq. (3), or ID of some other mathematical expression for the acoustic model. Similarly, as further illustrated in FIG. 5B, q different space configurations S2C1, S2C2, . . . , S2Cq of the same physical space S2 are associated with q different sets of acoustic model parameters {AM_P21}, {AM_P22}, . . . , {AM_P2$q$} and with acoustic model ID AM2, e.g., ID of Eq. (2), ID of Eq. (3), or ID of some other mathematical expression of the acoustic model; and r different space configurations SnC1, SnC2, SnCr of the same physical space Sn are associated with r different sets of acoustic model parameters {AM_Pn1}, {AM_Pn2}, . . . , {AM_Pnr} and with acoustic model ID AMn, e.g., ID of Eq. (2), ID of Eq. (3), or ID of some other mathematical expression of the acoustic model. The mapping module 527 (or some other module of the mapping server 230) may pull out a corresponding set of acoustic model parameters 545 and a corresponding acoustic model ID 550 from the virtual model 530 once the mapping module 527 finds a space configuration ID 540 that corresponds to a current configuration of a physical space where the audio system is located (or will be located within a threshold time period). The mapping module 527 may provide the corresponding set of acoustic model parameters 545 and the corresponding acoustic model ID 550 to the communication module 525 for further conveyance to the audio system 400.

FIG. 6A is a flowchart illustrating a process 600 for generating and storing a plurality of acoustic model parameters and an indication about an acoustic model, in accordance with one or more embodiments. The process 600 of FIG. 6A may be performed by the components of an apparatus, e.g., the mapping server 230 of FIG. 5A or the audio system 400 of FIG. 4. Other entities (e.g., components of the headset 100 of FIG. 1A, components of the headset 105 of FIG. 1B, and/or components shown in FIG. 7) may perform some or all of the steps of the process 600 in other embodiments. Likewise, embodiments may include different and/or additional steps, or perform the steps in different orders.

The apparatus estimates 605 (e.g., via the parameter estimator module 510 or the audio controller 430) a plurality of modal parameters for a set of discrete locations within a local area using a set of room impulse responses for the set of discrete locations, wherein the local area includes an audio system (e.g., the audio system 400). The plurality of modal parameters comprises a respective amplitude, a frequency and a decay factor for each discrete location in the set of discrete locations for a corresponding acoustic mode. The respective amplitude is a function of each discrete location, the frequency is same for all discrete locations in the set of discrete locations, and the decay factor is same for all discrete locations in the set of discrete locations. In one or more embodiments, the set of room impulse responses may be measured by the audio system. In one or more other embodiments, at least one room impulse response from the set of room impulse responses is estimated for a corresponding discrete location relative to a defined position in the local area based on a first audio originated from the defined position and recorded by a first audio system and a second audio received at the corresponding discrete location and recorded by a second audio system. The apparatus estimates 605 the plurality of modal parameters for the set of discrete locations by applying a signal classification based algorithm (e.g., the ESPRIT algorithm, the MUSIC algorithm, some other signal classification algorithm, or combination thereof) to the set of room impulse responses.

The apparatus generates 610 (e.g., via the model fitting module 515 or the audio controller 430) a plurality of acoustic model parameters by fitting the plurality of modal parameters to an acoustic model that accounts for a physical geometry of the local area. The plurality of acoustic model parameters may comprise a plurality of wave numbers associated with physical dimensions of the local area and at least one constant value, the wave numbers and the at least one constant being part of the acoustic model. The acoustic model may comprise a combination of a plurality of cosine functions, the combination being defined based on the plurality of acoustic model parameters. The apparatus may perform a non-linear optimization algorithm to fit the plurality of modal parameters to the acoustic model to generate the plurality of acoustic model parameters.

The apparatus stores 615, at a non-transitory computer-readable storage medium (e.g., of the memory module 520 or the data store 435), the plurality of acoustic model parameters and an indication about the acoustic model. The apparatus stores 615 the plurality of acoustic model parameters and the indication about the acoustic model at a corresponding location of a virtual model, e.g., the virtual model 530 of FIG. 5B. The plurality of acoustic model parameters are stored, e.g., in the virtual model 530 as a corresponding set of model parameters 545 for a corresponding physical space ID 535 and a corresponding space mode ID 540. The indication about the acoustic model is stored, e.g., in the virtual model 530 as a corresponding acoustic model ID 550.

The apparatus provides 620 (e.g., via the communication module 525 or the audio controller 430) the plurality of acoustic model parameters and the indication about the acoustic model to the audio system (e.g., to the sound filter module 480) for presentation of audio content. The audio system (e.g., via the sound filter module 480) determines a sound filter using the plurality of acoustic model parameters and the indication about the acoustic model. The audio system (e.g., via the sound filter module 480) presents the audio content to a user of the audio system by filtering the audio content via the determined sound filter.

Figure 6B:
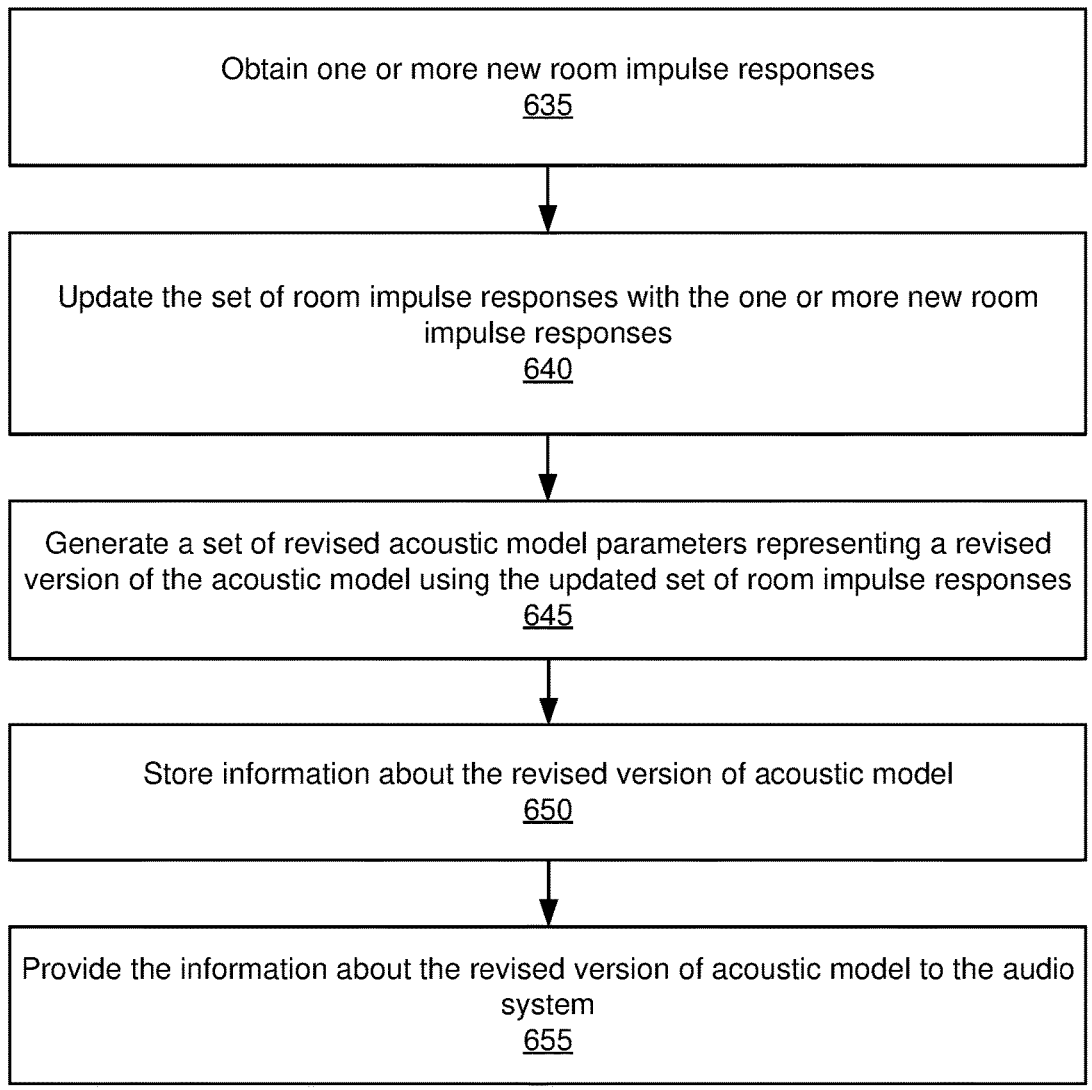
FIG. 6B is a flowchart illustrating a process for updating the acoustic model, in accordance with one or more embodiments.

FIG. 6B is a flowchart illustrating a process 630 for updating acoustic model parameters, in accordance with one or more embodiments. The process 630 of FIG. 6B may be performed by the components of the apparatus, e.g., the mapping server 230 of FIG. 5A or the audio system 400 of FIG. 4. Other entities (e.g., components of the headset 100 of FIG. 1A, components of the headset 105 of FIG. 1B, and/or components shown in FIG. 7) may perform some or all of the steps of the process 630 in other embodiments. Likewise, embodiments may include different and/or additional steps, or perform the steps in different orders.

The apparatus obtains 635 (e.g., via the communication module 525 or the audio controller 430) one or more new room impulse responses. The one or more new room impulse responses may be measured or determined by the audio system 400 and/or by one or more other audio systems.

The apparatus updates 640 (e.g., via the communication module 525 or the audio controller 430) the set of room impulse responses with the one or more new room impulse responses. As the apparatus (e.g., the mapping server 230 or the audio system 400) continue to update the available set of room impulse responses, e.g., as the audio system 400 is being actively used in new physical spaces, the robustness and quality of estimated acoustic model parameters and the corresponding acoustic model can be improved.

Based on the updated set of room impulse responses, the apparatus generates 645 (e.g., via the model fitting module 515 or the audio controller 430) a set of revised acoustic model parameters representing a revised version of the acoustic model. A quality metric of the revised acoustic model parameters and thus a quality metric of the revised version of the acoustic model is increased, e.g., because a larger number of room impulse responses is available in the updated set.

The apparatus stores 650, at the non-transitory computer-readable storage medium (e.g., of the memory module 520 or the data store 435) information about the revised version of acoustic model, i.e., the set of revised acoustic model parameters. The apparatus stores 650 the information about the revised version of acoustic model at a corresponding location of the virtual model, e.g., the virtual model 530. The revised set of acoustic model parameters are stored, e.g., in the virtual model 530 as a corresponding set of revised acoustic model parameters 545 for a corresponding physical space ID 535, a corresponding space configuration ID 540, and a corresponding acoustic model ID 550.

The apparatus provides 655 (e.g., via the communication module 525 or a module of the audio controller 430) the information about the revised version of acoustic model (i.e., the set of revised acoustic model parameters) to the audio system (e.g., the audio system 400). The audio system (e.g., via the sound filter module 480) determines an updated version of the sound filter using the set of revised acoustic model parameters and an identifier about the corresponding acoustic model. The audio system (e.g., via the sound filter module 480) presents the audio content to the user by filtering the audio content via the updated version of sound filter.

Figure 6C:
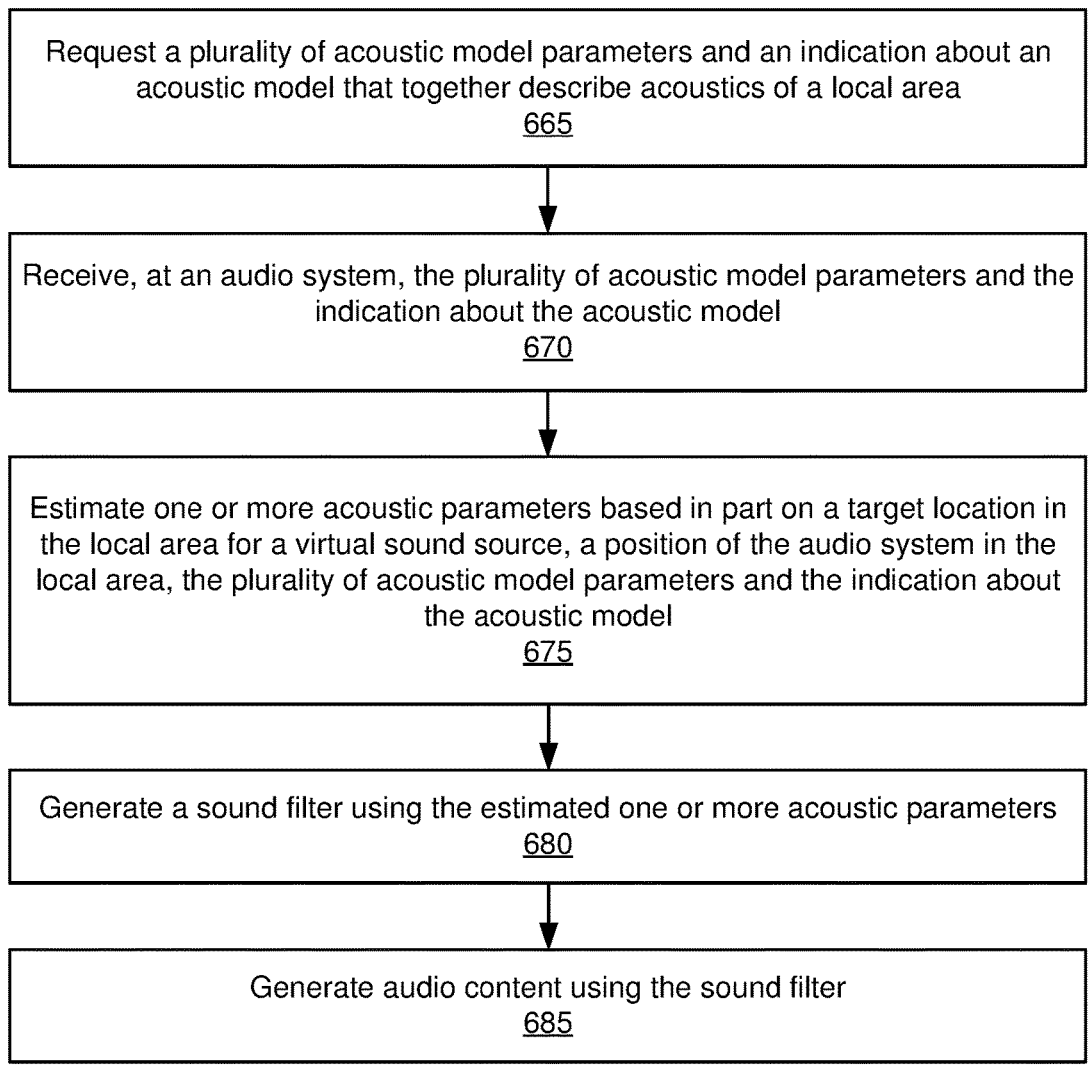
FIG. 6C is a flowchart illustrating a process for estimating a set of acoustic parameters using the stored acoustic model parameters and the indication about the acoustic model, in accordance with one or more embodiments.

FIG. 6C is a flowchart illustrating a process 660 for estimating a set of acoustic parameters using the stored acoustic model parameters and the indication about the acoustic model, in accordance with one or more embodiments. The process 660 of FIG. 6C may be performed by components of an audio system, e.g., the audio system 400 of FIG. 4. Other entities (e.g., components of the headset 100 of FIG. 1A, components of the headset 105 of FIG. 1B, and/or components shown in FIG. 7) may perform some or all of the steps of the process 660 in other embodiments.

Likewise, embodiments may include different and/or additional steps, or perform the steps in different orders.

The audio system requests 665 (e.g., via the audio controller 430) a plurality of acoustic model parameters and an indication about an acoustic model that together describe acoustics of a local area. The requested plurality of acoustic model parameters and an indication about an acoustic model may be stored at a non-transitory computer-readable storage medium (e.g., of the memory module 520 or the data store 435), at a corresponding location of a virtual model, e.g., the virtual model 530. The plurality of acoustic model parameters may be stored as a corresponding set of acoustic model parameters 545 for a corresponding physical space ID 535 and a corresponding space configuration ID 540, and the indication about the acoustic model may be stored as a corresponding acoustic model ID 550. The request from the audio system includes information about one or more physical properties of the local area (e.g., physical geometry and/or materials of surfaces) and information about a configuration of the local area where the audio system is currently located or will be located within a defined time period. In one or more embodiments, the audio system requests 665 the plurality of acoustic model parameters and the indication about the acoustic model before the audio system is actually located within the local area. In one or more other embodiments, the audio system requests 665 the plurality of acoustic model parameters and the indication about the acoustic model when/after the audio system enters the local area.

The audio system receives 670 (e.g., via the audio controller 430) the plurality of acoustic model parameters and the indication about the acoustic model. The plurality of acoustic model parameters and the indication about the acoustic model are retrieved from the non-transitory computer-readable storage medium (e.g., via the mapping module 527 or the audio controller 430) based on the information about the configuration of the local area received from the audio system.

The audio system estimates 675 (e.g., via the sound filter module 480) one or more acoustic parameters based in part on a target location in the local area for a virtual sound source, a position of the audio system in the local area, the plurality of acoustic model parameters and the indication about the acoustic model. In one or more embodiments, the audio system estimates 675 the one or more acoustic parameters by interpolating or extrapolating the plurality of acoustic model parameters for the target location. In some embodiments, the audio system estimates 675 a plurality of binaural acoustic parameters based in part on the target location in the local area for the virtual sound source, the position of the audio system in the local area, the plurality of acoustic model parameters and the indication about the acoustic model.

The audio system generates 680 (e.g., via the sound filter module 480) a sound filter using the estimated one or more acoustic parameters. In some embodiments, the audio system determines 680 a respective sound filter for each ear of a user of the audio system using one or more corresponding parameters of the plurality of binaural acoustic parameters.

The audio system generates 685 (e.g., via the sound filter module 480) audio content for the user of the audio system using the sound filter. In some embodiments, the audio system generates 685 the audio content for each ear of the user using the respective sound filter for each ear. In some embodiments, the audio system (e.g., the sound filter module 480) can apply the sound filter recursively, e.g., by processing an input audio using the acoustic parameters to generate the audio content (i.e., output audio) for an acoustic mode m of the local area, such as:

$$y_m(t)=\gamma_m x(t)+e^{(j\omega_m-\alpha_m)}y_m(t-1), \quad (4)$$

where x(t) is the input audio at a time instant t; $y_m(t)$ is the generated audio content at time t; $y_m(t-1)$ is the generated audio content at a previous time instant t−1; $\gamma_m$ is an amplitude for the acoustic mode m for the position of the audio system in the local area; $\omega_m$ is a frequency for the acoustic mode m; and $\alpha_m$ is a decay factor for the acoustic mode m. The parameters $\gamma_m$, $\omega_m$ and $\alpha_m$ represent the acoustic parameters previously determined based in part on the target location in the local area for the virtual sound source, the position of the audio system in the local area, the plurality of acoustic model parameters and the indication about the acoustic model.

It should be noted that some other implementations of a virtual model for storing acoustic parameters at a mapping server and communicating the acoustic parameters to an audio system at a headset can be utilized, e.g., as described in U.S. application Ser. No. 16/366,484 (issued as U.S. Pat. No. 10,674,307) incorporated herein by reference in its entirety. Some other methods for estimating acoustic parameters and communicating the acoustic parameters among multiple systems (e.g., multiple audio systems at headsets) can be applied, e.g., as described in U.S. application Ser. No. 16/180,165 (issued as U.S. Pat. No. 10,440,498), U.S. application Ser. No. 16/405,950 (issued as U.S. Pat. No. 10,708,706), U.S. application Ser. No. 16/544,202 (issued as U.S. Pat. No. 10,616,706), and U.S. application Ser. No. 16/883,796 (issued as U.S. Pat. No. 10,873,825), incorporated herein by reference in their entirety.

System Environment

Figure 7:
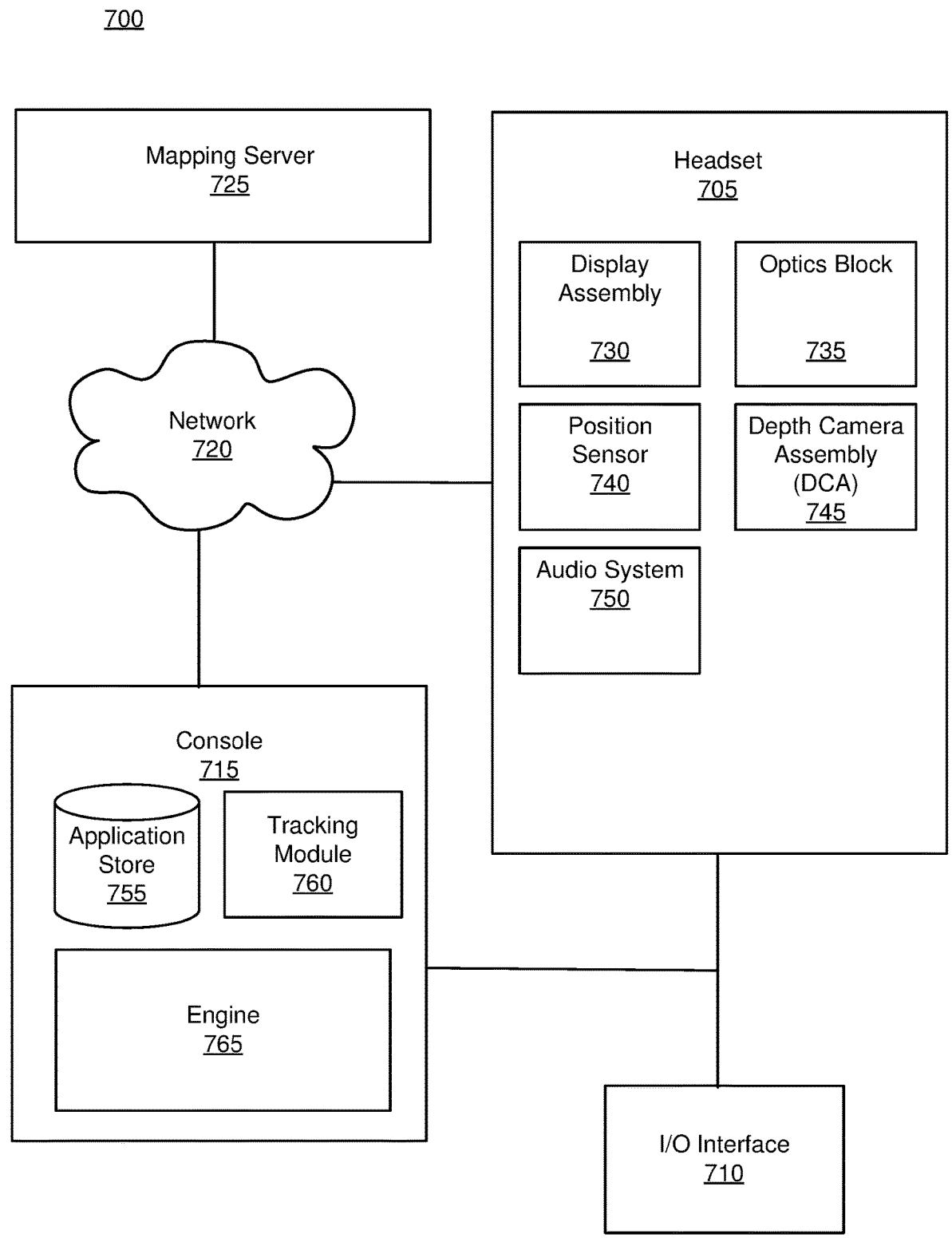
FIG. 7 is a system that includes a headset, in accordance with one or more embodiments.

FIG. 7 is a system 700 that includes a headset 705, in accordance with one or more embodiments. In some embodiments, the headset 705 may be the headset 100 of FIG. 1A or the headset 105 of FIG. 1B. The system 700 may operate in an artificial reality environment (e.g., a virtual reality environment, an augmented reality environment, a mixed reality environment, or some combination thereof). The system 700 shown by FIG. 7 includes the headset 705, an input/output (I/O) interface 710 that is coupled to a console 715, the network 720, and the mapping server 725. While FIG. 7 shows an example system 700 including one headset 705 and one I/O interface 710, in other embodiments any number of these components may be included in the system 700. For example, there may be multiple headsets each having an associated I/O interface 710, with each headset and I/O interface 710 communicating with the console 715. In alternative configurations, different and/or additional components may be included in the system 700. Additionally, functionality described in conjunction with one or more of the components shown in FIG. 7 may be distributed among the components in a different manner than described in conjunction with FIG. 7 in some embodiments. For example, some or all of the functionality of the console 715 may be provided by the headset 705.

The headset 705 includes the display assembly 730, an optics block 735, one or more position sensors 740, and the DCA 745. Some embodiments of headset 705 have different components than those described in conjunction with FIG. 7. Additionally, the functionality provided by various components described in conjunction with FIG. 7 may be differently distributed among the components of the headset 705 in other embodiments, or be captured in separate assemblies remote from the headset 705.

The display assembly 730 displays content to the user in accordance with data received from the console 715. The display assembly 730 displays the content using one or more display elements (e.g., the display elements 120). A display element may be, e.g., an electronic display. In various embodiments, the display assembly 730 comprises a single display element or multiple display elements (e.g., a display for each eye of a user). Examples of an electronic display include: a liquid crystal display (LCD), an organic light emitting diode (OLED) display, an active-matrix organic light-emitting diode display (AMOLED), a waveguide display, some other display, or some combination thereof. Note in some embodiments, the display element 120 may also include some or all of the functionality of the optics block 735.

The optics block 735 may magnify image light received from the electronic display, corrects optical errors associated with the image light, and presents the corrected image light to one or both eye-boxes of the headset 705. In various embodiments, the optics block 735 includes one or more optical elements. Example optical elements included in the optics block 735 include: an aperture, a Fresnel lens, a convex lens, a concave lens, a filter, a reflecting surface, or any other suitable optical element that affects image light. Moreover, the optics block 735 may include combinations of different optical elements. In some embodiments, one or more of the optical elements in the optics block 735 may have one or more coatings, such as partially reflective or anti-reflective coatings.

Magnification and focusing of the image light by the optics block 735 allows the electronic display to be physically smaller, weigh less, and consume less power than larger displays. Additionally, magnification may increase the field of view of the content presented by the electronic display. For example, the field of view of the displayed content is such that the displayed content is presented using almost all (e.g., approximately 110 degrees diagonal), and in some cases, all of the user's field of view. Additionally, in some embodiments, the amount of magnification may be adjusted by adding or removing optical elements.

In some embodiments, the optics block 735 may be designed to correct one or more types of optical error. Examples of optical error include barrel or pincushion distortion, longitudinal chromatic aberrations, or transverse chromatic aberrations. Other types of optical errors may further include spherical aberrations, chromatic aberrations, or errors due to the lens field curvature, astigmatisms, or any other type of optical error. In some embodiments, content provided to the electronic display for display is pre-distorted, and the optics block 735 corrects the distortion when it receives image light from the electronic display generated based on the content.

The position sensor 740 is an electronic device that generates data indicating a position of the headset 705. The position sensor 740 generates one or more measurement signals in response to motion of the headset 705. The position sensor 190 is an embodiment of the position sensor 740. Examples of a position sensor 740 include: one or more IMUS, one or more accelerometers, one or more gyroscopes, one or more magnetometers, another suitable type of sensor that detects motion, or some combination thereof. The position sensor 740 may include multiple accelerometers to measure translational motion (forward/back, up/down, left/right) and multiple gyroscopes to measure rotational motion (e.g., pitch, yaw, roll). In some embodiments, an IMU rapidly samples the measurement signals and calculates the estimated position of the headset 705 from the sampled data. For example, the IMU integrates the measurement signals received from the accelerometers over time to estimate a velocity vector and integrates the velocity vector over time to determine an estimated position of a reference point on the headset 705. The reference point is a point that may be used to describe the position of the headset 705. While the reference point may generally be defined as a point in space, however, in practice the reference point is defined as a point within the headset 705.

The DCA 745 generates depth information for a portion of the local area. The DCA includes one or more imaging devices and a DCA controller. The DCA 745 may also include an illuminator. Operation and structure of the DCA 745 is described above with regard to FIG. 1A.

The audio system 750 provides audio content to a user of the headset 705. The audio system 750 is substantially the same as the audio system 400 describe above. The audio system 750 may comprise one or acoustic sensors, one or more transducers, and an audio controller. The audio system 750 may provide spatialized audio content to the user using acoustic parameters. The acoustic parameters describe one or more acoustic properties (e.g., a room impulse response) of the local area. The audio system 750 may receive information about one or more physical properties of the local area from e.g., the DCA 745. The audio system 750 transmits, via the network 720, this information to the mapping server 725 for retrieving a corresponding set of acoustic model parameters and an identifier of a corresponding acoustic model. Upon receiving the set of acoustic model parameters and the identifier of the acoustic model from the mapping server 725 over the network 720, the audio system 750 may determine acoustic parameters for its current location in the local area or for a location in the local area where the audio system 750 will be located within a threshold time period. The audio system 750 may generate one or more sound filters using the acoustic parameters, and use the one or more sound filters to provide audio content to the user. In some embodiments, instead of obtaining the acoustic model parameters and the identifier about the acoustic model from the mapping server 725, the audio system 750 can be configured to determine the acoustic model parameters and the identifier about the acoustic model using, e.g., a set of available room impulse responses.

The I/O interface 710 is a device that allows a user to send action requests and receive responses from the console 715. An action request is a request to perform a particular action. For example, an action request may be an instruction to start or end capture of image or video data, or an instruction to perform a particular action within an application. The I/O interface 710 may include one or more input devices. Example input devices include: a keyboard, a mouse, a game controller, or any other suitable device for receiving action requests and communicating the action requests to the console 715. An action request received by the I/O interface 710 is communicated to the console 715, which performs an action corresponding to the action request. In some embodiments, the I/O interface 710 includes an IMU that captures calibration data indicating an estimated position of the I/O interface 710 relative to an initial position of the I/O interface 710. In some embodiments, the I/O interface 710 may provide haptic feedback to the user in accordance with instructions received from the console 715. For example, haptic feedback is provided when an action request is received, or the console 715 communicates instructions to the I/O interface 710 causing the I/O interface 710 to generate haptic feedback when the console 715 performs an action.

The console 715 provides content to the headset 705 for processing in accordance with information received from one or more of: the DCA 745, the headset 705, and the I/O interface 710. In the example shown in FIG. 7, the console 715 includes an application store 755, a tracking module 760, and an engine 765. Some embodiments of the console 715 have different modules or components than those described in conjunction with FIG. 7. Similarly, the functions further described below may be distributed among components of the console 715 in a different manner than described in conjunction with FIG. 7. In some embodiments, the functionality discussed herein with respect to the console 715 may be implemented in the headset 705, or a remote system.

The application store 755 stores one or more applications for execution by the console 715. An application is a group of instructions, that when executed by a processor, generates content for presentation to the user. Content generated by an application may be in response to inputs received from the user via movement of the headset 705 or the I/O interface 710. Examples of applications include: gaming applications, conferencing applications, video playback applications, or other suitable applications.

The tracking module 760 tracks movements of the headset 705 or of the I/O interface 710 using information from the DCA 745, the one or more position sensors 740, or some combination thereof. For example, the tracking module 760 determines a position of a reference point of the headset 705 in a mapping of a local area based on information from the headset 705. The tracking module 760 may also determine positions of an object or virtual object. Additionally, in some embodiments, the tracking module 760 may use portions of data indicating a position of the headset 705 from the position sensor 740 as well as representations of the local area from the DCA 745 to predict a future location of the headset 705. The tracking module 760 provides the estimated or predicted future position of the headset 705 or the I/O interface 710 to the engine 765.

The engine 765 executes applications and receives position information, acceleration information, velocity information, predicted future positions, or some combination thereof, of the headset 705 from the tracking module 760. Based on the received information, the engine 765 determines content to provide to the headset 705 for presentation to the user. For example, if the received information indicates that the user has looked to the left, the engine 765 generates content for the headset 705 that mirrors the user's movement in a virtual local area or in a local area augmenting the local area with additional content. Additionally, the engine 765 performs an action within an application executing on the console 715 in response to an action request received from the I/O interface 710 and provides feedback to the user that the action was performed. The provided feedback may be visual or audible feedback via the headset 705 or haptic feedback via the I/O interface 710.

The network 720 couples the headset 705 and/or the console 715 to the mapping server 725. The network 720 may include any combination of local area and/or wide area networks using both wireless and/or wired communication systems. The network 720 may be an embodiment of the network 220.

The mapping server 725 may include a database that stores a virtual model describing a plurality of spaces, wherein one location in the virtual model corresponds to a current configuration of a local area of the headset 705. The mapping server 725 may estimate a plurality of modal parameters for a set of discrete locations within the local area using a set of room impulse responses for the set of discrete locations, wherein the local area includes the audio system 750. The set of room impulse responses may be previously stored at the database of the mapping server 725. The mapping server 725 may generate a plurality of acoustic model parameters by fitting the estimated modal parameters to an acoustic model that accounts for one or more physical properties of the local area. The mapping server 725 may store, at the corresponding location of the virtual model, the plurality of acoustic model parameters and an indication (e.g., an identifier) about the acoustic model. The mapping server 725 receives, from the headset 705 via the network 720, information about one or more physical properties of the local area. The user may adjust privacy settings to allow or prevent the headset 705 from transmitting information to the mapping server 725. The mapping server 725 determines, based on the received information, a location in the virtual model that is associated with the local area of the headset 705. The mapping server 725 pulls out, from the determined location in the virtual model, a set of acoustic model parameters and an identifier of an acoustic model associated with the local area. The mapping server 725 may transmit, over the network 720, the set of acoustic model parameters and the identifier of the acoustic model to the headset 705 (e.g. to the audio system 750). The mapping server 725 is an embodiment of the mapping server 230.

One or more components of system 700 may contain a privacy module that stores one or more privacy settings for user data elements. The user data elements describe the user or the headset 705. For example, the user data elements may describe a physical characteristic of the user, an action performed by the user, a location of the user of the headset 705, a location of the headset 705, an HRTF for the user, etc. Privacy settings (or "access settings") for a user data element may be stored in any suitable manner, such as, for example, in association with the user data element, in an index on an authorization server, in another suitable manner, or any suitable combination thereof.

A privacy setting for a user data element specifies how the user data element (or particular information associated with the user data element) can be accessed, stored, or otherwise used (e.g., viewed, shared, modified, copied, executed, surfaced, or identified). In some embodiments, the privacy settings for a user data element may specify a "blocked list" of entities that may not access certain information associated with the user data element. The privacy settings associated with the user data element may specify any suitable granularity of permitted access or denial of access. For example, some entities may have permission to see that a specific user data element exists, some entities may have permission to view the content of the specific user data element, and some entities may have permission to modify the specific user data element. The privacy settings may allow the user to allow other entities to access or store user data elements for a finite period of time.

The privacy settings may allow a user to specify one or more geographic locations from which user data elements can be accessed. Access or denial of access to the user data elements may depend on the geographic location of an entity who is attempting to access the user data elements. For example, the user may allow access to a user data element and specify that the user data element is accessible to an entity only while the user is in a particular location. If the user leaves the particular location, the user data element may no longer be accessible to the entity. As another example, the user may specify that a user data element is accessible only to entities within a threshold distance from the user, such as another user of a headset within the same local area as the user. If the user subsequently changes location, the entity with access to the user data element may lose access, while a new group of entities may gain access as they come within the threshold distance of the user.

The system 700 may include one or more authorization/privacy servers for enforcing privacy settings. A request from an entity for a particular user data element may identify the entity associated with the request and the user data element may be sent only to the entity if the authorization server determines that the entity is authorized to access the user data element based on the privacy settings associated with the user data element. If the requesting entity is not authorized to access the user data element, the authorization server may prevent the requested user data element from being retrieved or may prevent the requested user data element from being sent to the entity. Although this disclosure describes enforcing privacy settings in a particular manner, this disclosure contemplates enforcing privacy settings in any suitable manner.

Additional Configuration Information

The foregoing description of the embodiments has been presented for illustration; it is not intended to be exhaustive or to limit the patent rights to the precise forms disclosed. Persons skilled in the relevant art can appreciate that many modifications and variations are possible considering the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
    estimating a plurality of modal parameters for a set of discrete locations within a local area using a set of room impulse responses for the set of discrete locations, wherein the local area includes an audio system;
    generating a plurality of acoustic model parameters by fitting the plurality of modal parameters to an acoustic model that accounts for a physical geometry of the local area; and
    storing the plurality of acoustic model parameters and an indication about the acoustic model, wherein
    audio content is presented by the audio system using the plurality of acoustic model parameters and the indication about the acoustic model,
    the plurality of modal parameters comprises a respective amplitude, a frequency and a decay factor for each discrete location in the set of discrete locations for a corresponding acoustic mode, and
    the respective amplitude is a function of each discrete location in the set of discrete locations, the frequency is same for all discrete locations in the set of discrete locations, and the decay factor is same for all discrete locations in the set of discrete locations.

2. The method of claim 1, further comprising:
    obtaining, from the audio system, the set of room impulse responses measured by the audio system.

3. The method of claim 1, wherein a room impulse response from the set of room impulse responses for a corresponding discrete location relative to a defined position in the local area is estimated based on a first audio originated from the defined position and recorded by a first audio system and a second audio received at the corresponding discrete location and recorded by a second audio system.

4. The method of claim 1, further comprising:
    estimating the plurality of modal parameters for the set of discrete locations by applying a signal classification based algorithm to the set of room impulse responses.

5. The method of claim 1, further comprising:
    performing a non-linear optimization algorithm to fit the plurality of modal parameters to the acoustic model to generate the plurality of acoustic model parameters.

6. The method of claim 1, wherein the plurality of acoustic model parameters comprises a plurality of wave numbers associated with physical dimensions of the local area and at least one constant value, the plurality of wave numbers and the at least one constant value being part of the acoustic model.

7. The method of claim 1, wherein the acoustic model comprises a combination of a plurality of cosine functions, the combination being defined based on the plurality of acoustic model parameters.

8. The method of claim 1, further comprising:
receiving a request signal from the audio system; and
communicating, to the audio system in response to reception of the request signal, the plurality of acoustic model parameters and the indication about the acoustic model.

9. The method of claim 1, wherein the audio system:
estimates one or more acoustic parameters based in part on a target location in the local area for a virtual sound source, a position of the audio system in the local area, the plurality of acoustic model parameters and the indication about the acoustic model,
generates a sound filter using the one or more acoustic parameters, and
generates the audio content using the sound filter.

10. The method of claim 1, wherein the audio system:
estimates a plurality of binaural acoustic parameters based in part on a target location in the local area for a virtual sound source, a position of the audio system in the local area, the plurality of acoustic model parameters and the indication about the acoustic model,
generates a respective sound filter for each ear of a user of the audio system using one or more corresponding parameters of the plurality of binaural acoustic parameters, and
generates the audio content for each ear of the user using the respective sound filter.

11. An apparatus comprising:
a processor configured to:
estimate a plurality of modal parameters for a set of discrete locations within a local area using a set of room impulse responses for the set of discrete locations, wherein the local area includes an audio system, and
generate a plurality of acoustic model parameters by fitting the plurality of modal parameters to an acoustic model that accounts for a physical geometry of the local area; and
a non-transitory computer-readable storage medium configured to store the plurality of acoustic model parameters and an indication about the acoustic model, wherein
audio content is presented by a sound filter of the audio system using the plurality of acoustic model parameters and the indication about the acoustic model,
the plurality of modal parameters comprises a respective amplitude, a frequency and a decay factor for each discrete location in the set of discrete locations for a corresponding acoustic mode, and
the respective amplitude is a function of each discrete location in the set of discrete locations, the frequency is same for all discrete locations in the set of discrete locations, and the decay factor is same for all discrete locations in the set of discrete locations.

12. The apparatus of claim 11, wherein the processor is further configured to:
estimate the plurality of modal parameters for the set of discrete locations by applying a signal classification based algorithm to the set of room impulse responses.

13. The apparatus of claim 11, wherein the processor is further configured to:
perform a non-linear optimization algorithm to fit the plurality of modal parameters to the acoustic model to generate the plurality of acoustic model parameters.

14. The apparatus of claim 11, wherein the plurality of acoustic model parameters comprises a plurality of wave numbers associated with physical dimensions of the local area and at least one constant value, the plurality of wave numbers and the at least one constant value being part of the acoustic model.

15. The apparatus of claim 11, further comprising a transceiver configured to:
receive a request signal from the audio system; and
communicate, to the audio system in response to reception of the request signal, the plurality of acoustic model parameters and the indication about the acoustic model,
wherein the audio system:
estimates one or more acoustic parameters based in part on a target location in the local area for a virtual sound source, a position of the audio system in the local area, the plurality of acoustic model parameters and the indication about the acoustic model,
generates a sound filter using the one or more acoustic parameters, and
generates the audio content using the sound filter.

16. A non-transitory computer-readable storage medium having instructions encoded thereon that, when executed by a processor, cause the processor to:
estimate a plurality of modal parameters for a set of discrete locations within a local area using a set of room impulse responses for the set of discrete locations, wherein the local area includes an audio system;
generate a plurality of acoustic model parameters by fitting the plurality of modal parameters to an acoustic model that accounts for a physical geometry of the local area; and
store, at the non-transitory computer-readable storage medium, the plurality of acoustic model parameters and an indication about the acoustic model, wherein
audio content is presented by the audio system using the plurality of acoustic model parameters and the indication about the acoustic model,
the plurality of modal parameters comprises a respective amplitude, a frequency and a decay factor for each discrete location in the set of discrete locations for a corresponding acoustic mode, and
the respective amplitude is a function of each discrete location in the set of discrete locations, the frequency is same for all discrete locations in the set of discrete locations, and the decay factor is same for all discrete locations in the set of discrete locations.

17. The computer readable medium of claim 16, wherein the instructions further cause the processor to:
estimate the plurality of modal parameters for the set of discrete locations by applying a signal classification based algorithm to the set of room impulse responses; and
perform a non-linear optimization algorithm to fit the plurality of modal parameters to the acoustic model to generate the plurality of acoustic model parameters.

* * * * *

UNITED STATES PATENT AND TRADEMARK OFFICE
CERTIFICATE OF CORRECTION

| | |
|---|---|
| PATENT NO. | : 11,598,962 B1 |
| APPLICATION NO. | : 17/133938 |
| DATED | : March 7, 2023 |
| INVENTOR(S) | : Orchisama Das |

It is certified that error appears in the above-identified patent and that said Letters Patent is hereby corrected as shown below:

In the Claims

In Column 32, Claim 17, Line 52, delete "The computer readable medium" and insert -- The non-transitory computer-readable storage medium --, therefor.

Signed and Sealed this
Eighth Day of August, 2023

Katherine Kelly Vidal
*Director of the United States Patent and Trademark Office*